United States Patent
Araki et al.

(10) Patent No.: US 8,034,490 B2
(45) Date of Patent: Oct. 11, 2011

(54) SOLID ELECTROLYTE COMPRISING FLUORINE-CONTAINING POLYMER HAVING FLUORINE-CONTAINING ETHER CHAINS

(75) Inventors: Takayuki Araki, Settsu (JP); Meiten Koh, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 360 days.

(21) Appl. No.: 12/471,860

(22) Filed: May 26, 2009

(65) Prior Publication Data

US 2009/0291369 A1      Nov. 26, 2009

Related U.S. Application Data

(60) Division of application No. 11/157,957, filed on Jun. 22, 2005, now Pat. No. 7,553,589, which is a continuation-in-part of application No. PCT/JP03/16066, filed on Dec. 16, 2003.

(30) Foreign Application Priority Data

| Dec. 25, 2002 | (JP) | ................................. 2002-375091 |
| Apr. 28, 2003 | (JP) | ................................. 2003-124312 |
| Oct. 15, 2003 | (JP) | ................................. 2003-355456 |

(51) Int. Cl.
*H01M 10/40* (2006.01)
(52) U.S. Cl. ........................ 429/316; 252/62.2; 361/525
(58) Field of Classification Search .................. 429/316; 252/62.2; 361/525
See application file for complete search history.

(56) References Cited

U.S. PATENT DOCUMENTS 7,553,589 B2 *   6/2009   Araki et al. ................... 429/316
7,682,753 B2 *   3/2010   Koh et al. ..................... 429/316

FOREIGN PATENT DOCUMENTS

| EP | 1091435 A1 | * | 4/2001 |
| EP | 1164654 A2 | * | 12/2001 |
| EP | 1167397 | | 1/2002 |
| EP | 1167397 A1 | * | 1/2002 |
| EP | 1551036 A1 | | 7/2005 |
| JP | 08-222270 | * | 8/1996 |
| JP | 8-222270 A | | 8/1996 |
| JP | 2001-64417 A | | 3/2001 |
| WO | WO-99/59216 | * | 11/1999 |
| WO | 2004/036599 | | 4/2004 |
| WO | 2004/059664 A1 | | 7/2004 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

There is provided a fluorine-containing polymer solid electrolyte which has an excellent ion-conducting property, is high in oxidation resistance, is stable electrochemically and thermally, has sufficient strength and is applicable to various electrochemical devices. The electrolyte comprises (I) a non-crystalline fluorine-containing polymer which has a polar nonionic functional group and has, in a side chain of the polymer molecule, a structural unit D having 1 to 4 units derived from a fluorine-containing ether in the form of continuous chain, (II) an electrolytic compound and as case demands, (III) a solvent. The electrolyte has an ionic conductivity of from $10^{-10}$ to $10^1$ S/cm measured at 25° C. by an alternating current complex impedance method, and is useful for various electrochemical devices.

10 Claims, No Drawings

SOLID ELECTROLYTE COMPRISING FLUORINE-CONTAINING POLYMER HAVING FLUORINE-CONTAINING ETHER CHAINS

CROSS-REFERENCE TO RELATED APPLICATION

This application is a divisional of U.S. application Ser. No. 11/157,957, filed Jun. 22, 2005, which is a continuation-in-part of PCT international application No. PCT/JP03/16066 filed on Dec. 16, 2003, which claims benefit of JP 2002-375091 filed Dec. 25, 2002, JP 2003-124312 filed Apr. 28, 2003 and JP 2003-355456 filed Oct. 15, 2003. The above-noted applications are incorporated herein by reference in their entirety.

BACKGROUND OF THE INVENTION

The present invention relates to a fluorine-containing polymer solid electrolyte which comprises a non-crystalline fluorine-containing polymer having nonionic functional group and a side chain having structural units derived from a specific fluorine-containing ether, an electrolytic compound and further a solvent as case demands.

The fluorine-containing polymer solid electrolyte is useful as an electrolyte for electrochemical devices, particularly various batteries, capacitors, solid display devices and sensors.

So far ion conductors in the form of solution or paste have been used as an electrolyte for electrochemical devices such as batteries, capacitors and sensors from the viewpoint of good ion-conducting property. However electrolytes of such forms have problems with safety such as damage of a device due to leakage of solution and occurrence of fire. Also it is pointed out that there are problems that since scattering of solution arises at a sealing part of a housing case of a device, a high technique for sealing is required, and further a separator for impregnation of an electrolytic solution is necessary and therefore there is a limit in downsizing of devices and making devices thin.

On the other hand, there are proposed solid electrolytes of inorganic crystalline substances, inorganic glass, organic polymeric substances and the like. Representative examples of inorganic materials are ceramics such as $\beta$-$Al_2O_3$. However since those ceramics exhibit ion-conducting property only at high temperatures of not less than 300° C., they cannot be applied to batteries for use at ordinary temperature, and applications thereof are limited. Also ceramics are very fragile and have disadvantages that breakage occurs when assembling or using devices and molding thereof is difficult. Therefore ceramics are not practicable.

Organic polymeric substances are generally excellent in processability and moldability, and obtained solid electrolytes have flexibility and processability in bending. Therefore, a degree of freedom in device design is increased, and development thereof is expected. At present, there is available a complex of polyethylene oxide (PEO) and inorganic salt as a representative organic solid polymer having ion-conducting property, which however, has low ion-conducting property when an electrolytic solution is not contained therein, and is not practicable. Therefore an amorphous polypropylene oxide (PPO) and a PEO derivative having an oligoethylene oxide chain in its side chain are studied, but ion-conducting property thereof is still insufficient (for example, JP8-113496A, JP8-173435A, JP8-183186A, etc.).

Also there is a trial of enhancing ion-conducting property by adding, to a PEO/inorganic salt complex, a proper amount of plasticizer such as an organic solvent. However since the mixture has flowability and cannot maintain a solid state, there are disadvantages that assembling work of device becomes difficult, fire arises more easily and strength is low.

Heretofore polymers having anionic functional group such as —$SO_3^-$ or —$COOC^-$ at an end of a side chain thereof have been primarily studied as an ion-conducting material of fluorine-containing polymeric substance. Those fluorine-containing polymers act as a polymeric anion and since the polymers function as a single ion conductor for conduction of a cation only, application thereof is limited and applications mainly to an electrolyte for fuel cells and ion exchange membrane have been studied (for example, U.S. Pat. No. 3,282, 875, Journal of Power Sources, No. 29, p. 399 (1990), Journal of Electrochemical Society, No. 135, p. 2209 (1988), etc.).

With respect to an ion-conducting material which is prepared from a fluorine-containing polymeric substance having no ionic functional group, there have been widely studied, as a gel electrolyte for lithium battery, a compound comprising polyvinylidene fluoride and electrolytic solution and a compound comprising a polyvinylidene fluoride-hexafluoropropene copolymer and electrolytic solution (for example, Polymer Bulletin, Vol. 7, pp. 271-275 (1982), U.S. Pat. No. 5,296, 318, etc.). A polymer battery obtained from polyvinylidene fluoride is electrochemically stable and has a characteristic that the polymer itself is difficult to burn since fluorine atom is contained therein, but has a disadvantage that when temperature is raised, the electrolytic solution oozes from the polymer. For the purpose to improve an ability of holding an electrolytic solution, a polyvinylidene fluoride-hexafluoropropene copolymer is used, but since the polymer itself has no ion-conducting property, it cannot be used for a solid electrolyte, and also even when it is used as a gel electrolyte, a large amount of electrolytic solution need be contained in order to obtain sufficient ion-conducting property. As a result, there remain problems with safety such as damage of device due to leakage of solution and occurrence of fire, and a high technique for sealing is required to prevent scattering of solution at a sealing part of a housing case of a device.

On the other hand, a PPO derivative prepared by converting methyl group of PPO to trifluoromethyl has been studied mainly as an electrolyte for lithium battery (for example, JP6-103764A, JP8-217872A, JP8-222270A, JP9-48832A, etc.). However there are disadvantages that when an electrolytic solution is not contained, ion-conducting property is low, oxidation resistance and heat resistance are not sufficient and a mechanical strength is low as well as a disadvantage that the PPO derivative subjected to crosslinking with an acrylic crosslinking agent is electrochemically unstable.

SUMMARY OF THE INVENTION

The object of the present invention is to provide a solid electrolyte which has high ion-conducting property, has electrochemical and thermal stability and is safe. Another object of the present invention is to provide a fluorine-containing polymer solid electrolyte having strength which makes it possible to make thin, small and light-weight electrochemical devices such as battery, capacitor and electrochromic device.

The present inventors have made intensive studies and as a result, have found that a solid electrolyte comprising an electrolytic compound and a specific fluorine-containing polymer containing nonionic functional group and having a structural unit derived from a specific fluorine-containing ether in its side chain, and also the solid electrolyte further containing a solvent have excellent ion-conducting property, high oxidation resistance and electrochemical and thermal stability and can have sufficient strength, and have completed the present invention.

Also the present inventors have found that those solid electrolytes are applicable to various electrochemical devices making use of the mentioned characteristics.

Namely, the first of the present invention relates to a fluorine-containing polymer solid electrolyte which has an ionic conductivity of from $10^{-10}$ to $10^{1}$ S/cm measured at 25° C. by an alternating current complex impedance method and comprises:
(I) a non-crystalline fluorine-containing polymer which has a polar nonionic functional group Y and has recurring units having, in a side chain thereof, structural units D derived from a fluorine-containing ether and represented by the formula (D):

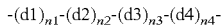

wherein
(d1) is $-(OCF_2CF_2CF_2)-$,
(d2) is $-(OCFX^1CF_2)-$ or $-(OCF_2CFX^1)-$,
(d3) is $-(OCFX^2)-$,
(d4) is $-(OCH_2CF_2CF_2)-$ or $-(OCF_2CF_2CH_2)-$;
n1, n2, n3 and n4 are the same or different and each is 0 or an integer of 1 or more, n1+n2+n3+n4 is an integer of from 1 to 4; $X^1$ and $X^2$ are the same or different and each is F or $CF_3$; in the side chain, two or more structural units (D) are not bonded continuously to each other, and (II) an electrolytic compound.

The second of the present invention relates to a fluorine-containing polymer solid electrolyte which has an ionic conductivity of from $10^{-10}$ to $10^{1}$ S/cm measured at 25° C. by an alternating current complex impedance method and comprises:
(I) the above-mentioned non-crystalline fluorine-containing polymer having nonionic functional group,
(II) an electrolytic compound, and
(III) an organic solvent and/or water.

In the non-crystalline fluorine-containing polymer (I), the structural units D derived from a fluorine-containing ether are present in the side chain and in addition, the structural units D may be present also in the trunk chain.

The third of the present invention relates to electrochemical devices produced using the above-mentioned fluorine-containing polymer solid electrolytes, particularly various batteries, capacitors, solid display devices and various sensors.

The fourth of the present invention relates to a fluorine-containing polymer solid electrolyte which has an ionic conductivity of from $10^{-10}$ to $10^{1}$ S/cm measured at 25° C. by an alternating current complex impedance method and comprises:
(Ib) a non-crystalline fluorine-containing polymer having hydroxyl group which has a number average molecular weight of from 500 to 1,000,000, has recurring units having, in a side chain thereof, structural units D derived from a fluorine-containing ether and represented by the formula (D):

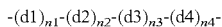

wherein
(d1) is $-(OCF_2CF_2CF_2)-$,
(d2) is $-(OCFX^1CF_2)-$ or $-(OCF_2CFX^1)-$,
(d3) is $-(OCFX^2)-$,
(d4) is $-(OCH_2CF_2CF_2)-$ or $-(OCF_2CF_2CH_2)-$;
n1, n2, n3 and n4 are the same or different and each is 0 or an integer of 1 or more, n1+n2+n3+n4 is an integer of from 1 to 4; $X^1$ and $X^2$ are the same or different and each is F or $CF_3$; in the side chain, two or more structural units (D) are not bonded continuously to each other, and is represented by the formula (1b):

-(M1b)-(A)-            (1b)

wherein the structural unit M1b is a structural unit derived from a fluorine-containing ethylenic monomer (m1b) having hydroxyl group and represented by the formula (M1b-2):

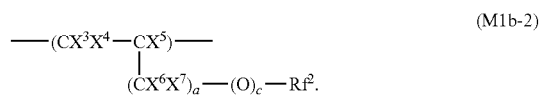

wherein $X^3$ and $X^4$ are the same or different and each is H or F; $X^5$ is H, F, $CH_3$ or $CF_3$; $X^6$ and $X^7$ are the same or different and each is H, F or $CF_3$; $Rf^2$ is a fluorine-containing monovalent organic group having hydroxyl group which has 2 to 100 carbon atoms and 1 to 4 structures of the formula (D1b):

wherein $R^1$ is a di-, tri- or tetra-valent organic group; n5 is 0 or 1; n6 is an integer of from 1 to 3; D is as defined in the above-mentioned formula (D), and two or more structural units (D) are not bonded continuously to each other; a is 0 or an integer of from 1 to 3; c is 0 or 1;
the structural unit A is a structural unit derived from a monomer (a) copolymerizable with the monomer (m1b), and
the structural units M1b and A are contained in amounts of from 1 to 100% by mole and from 0 to 99% by mole, respectively, and
(IIc) at least one selected from ionic polymers or salts thereof.

The fifth of the present invention relates to electrochemical devices, particularly various batteries, capacitors, solid display devices and various sensors which are produced using the above-mentioned fluorine-containing polymer solid electrolyte comprising (Ib) the non-crystalline fluorine-containing polymer having hydroxyl group and (IIc) at least one selected from the ionic polymers or salts thereof.

In the present invention, being non-crystalline means that when by using DSC (differential scanning calorimeter), in the 1st run, temperature is raised up to 200° C. at a temperature elevating rate of 10° C./min, followed by maintaining at 200° C. for one minute and cooling down to 25° C. at a temperature decreasing rate of 10° C./min, and then when heating at a temperature elevating rate of 10° C./min, an absorption peak derived from melting is not substantially observed or heat of fusion is not more than 1 J/g.

DETAILED DESCRIPTION

The solid electrolyte of the present invention is characterized in that the fluorine-containing polymer (I) contains the structural unit D having fluorine-containing ether unit represented by:
(d1): $-(OCF_2CF_2CF_2)_{n1}-$,
(d2): $-(OCFX^1CF_2)_{n2}-$ or $-(OCF_2CFX^1)_{n2}-$,
(d3): $-(OCFX^2)_{n3}-$ and
(d4): $-(OCH_2CF_2CF_2)_{n4}-$ or $-(OCF_2CF_2CH_2)_{n4}-$ wherein $X^1$ and $X^2$ are as defined above, which may be sole ether unit or a continuous chain of 2 to 4 ether units of one or more kinds. If the number of units chained continuously is not less than five, miscibility with the electrolytic material (II) becomes insufficient and mechanical properties are lowered.

Kind and combination of the units (d1), (d2), (d3) and (d4) contained in the continuous chain are not limited particularly. A chain of units may comprise units of one kind or may comprise units of two or more kinds. Preferred units are, for example, the units (d1) and (d2) but are not limited to them.

When the fluorine-containing polymer (I) having the structural unit D is used, there can be provided a solid electrolyte having enhanced characteristics such as ion-conducting property, heat resistance, oxidation resistance and safety as compared with conventional PEO.

Therefore if the content of structural unit D is decreased, its effect is limited. The preferred content of structural unit D in the polymer (I) is not less than 10% by weight, desirably not less than 50% by weight. If the content is less than 10% by weight, the above-mentioned excellent characteristics become insufficient.

The polar nonionic functional group Y may be bonded in either of the trunk chain or the side chain or may be bonded in both thereof. From the viewpoint of further enhancement of ion-conducting property and good dispersibility with the electrolytic material (II), it is preferable that the functional group Y is bonded in the side chain.

Next, explained below is the non-crystalline fluorine-containing polymer (I) having the polar nonionic functional group Y and the structural unit D in the side chain thereof.

Preferred examples of the non-crystalline fluorine-containing polymer (I) having the structural unit D in the side chain are those represented by the following formula (1).

(1) Non-crystalline fluorine-containing polymer which has a number average molecular weight of from 500 to 1,000,000 and is represented by the formula (1):

(M1)-(A1)-(A)    (1)

wherein the structural unit M1 is a structural unit derived from a monomer (m1) having, in its side chain, the structural unit of the above-mentioned formula (D) derived from a fluorine-containing ether, and two or more structural units (D) are not bonded continuously to each other; the structural unit A1 is a structural unit derived from a monomer (a1) copolymerizable with the monomer (m1); the structural unit A is a structural unit derived from a monomer (a) copolymerizable with the monomers (m1) and (a1); the polar nonionic functional group Y is contained at least in a part of at least one of the structural units M1 and A1, and when the structural unit M1 has the polar nonionic functional group Y, the structural units A1 and A may be the same, and the structural units M1, A1 and A are contained in amounts of from 1 to 100% by mole, from 0 to 99% by mole and from 0 to 99% by mole, respectively.

When the polar nonionic functional group Y is contained only in the structural unit A1, preferred is a non-crystalline fluorine-containing polymer which has a number average molecular weight of from 500 to 1,000,000 and is represented by the formula (2):

(M2)-(A2)-(A)    (2)

wherein the structural unit M2 is a structural unit derived from a monomer (m2) having, in its side chain, the structural unit of the above-mentioned formula (D) derived from a fluorine-containing ether, and has no polar nonionic functional group Y; the structural unit A2 is a structural unit derived from a monomer (a2) which is copolymerizable with the monomer (m2) and has the polar nonionic functional group Y; the structural unit A is a structural unit derived from a monomer (a) copolymerizable with the monomers (m2) and (a2), and the structural units M2, A2 and A are contained in amounts of from 1 to 99% by mole, from 1 to 99% by mole and from 0 to 98% by mole, respectively.

Example of the structural unit M1 is the structural unit M-1 represented by the following formula (M-1). Examples of the structural unit M2 are the following structural units M-1 to M-4, in which the polar nonionic functional group Y is not contained in Rf (hereinafter the same). Structural unit derived from a fluorine-containing ethylenic monomer and represented by the formula (M-1):

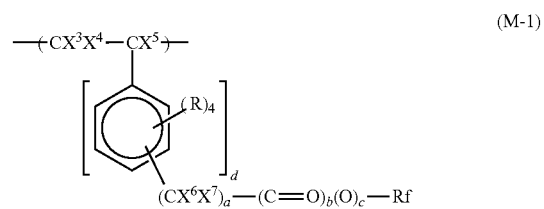

(M-1)

wherein $X^3$ and $X^4$ are the same or different and each is H or F; $X^5$ is H, F, $CH_3$ or $CF_3$; $X^6$ and $X^7$ are the same or different and each is H, F or $CF_3$; Rf is a fluorine-containing monovalent organic group having 2 to 100 carbon atoms and 1 to 4 structural units D mentioned above, in which two or more structural units D are not bonded to each other in the form of linear chain and the polar nonionic functional group Y may be contained or may not be contained therein; R are the same or different and each is H, F, a hydrocarbon group having 1 to 5 carbon atoms or a fluorine-containing alkyl group having 1 to 5 carbon atoms; a is 0 or an integer of from 1 to 3; b, c and d are the same or different and each is 0 or 1

Examples of the structural unit M-1 are structural units M-2 to M-4 represented by the formulae (M-2) to (M-4), respectively. Structural unit M-2 derived from a fluorine-containing ethylenic monomer and represented by the formula (M-2):

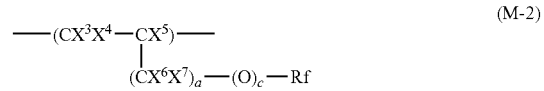

(M-2)

wherein $X^3$, $X^4$, $X^5$, $X^6$, $X^7$, Rf, a and c are as defined above.

Concretely there is an ether type structural unit M-2a derived from a fluorine-containing ethylenic monomer and represented by the formula (M-2a):

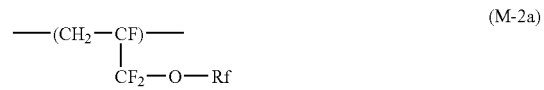

(M-2a)

wherein Rf is as defined above.

Ester type structural unit M-3 derived from a fluorine-containing ethylenic monomer and represented by the formula (M-3):

$$-(CX^3X^4-CX^5)-$$
$$\quad\quad\quad\quad |$$
$$\quad\quad\quad\quad C-O-Rf$$
$$\quad\quad\quad\quad \|$$
$$\quad\quad\quad\quad O$$
(M-3)

wherein $X^3$, $X^4$, $X^5$ and Rf are as defined above.

Structural unit M-4 having an aromatic ring which is derived from a fluorine-containing ethylenic monomer and represented by the formula (M-4):

(M-4)

$-(CX^3X^4-CX^5)-$ with aromatic ring bearing $(R)_4$ and $(CH_2)_a-(C=O)_b(O)_c-Rf$ wherein $X^3$, $X^4$, $X^5$, Rf, R, a, b and c are as defined above.

In the structural units M-2, examples of the monomer (c=1) providing the ether type structural unit are, for instance, fluorine-containing vinyl ether and fluorine-containing allyl ether, and concretely there are the following monomers. Hereinafter Rf is as defined above.

$CH_2=CHO-Rf$, $CH_2=CHCH_2O-Rf$, $CF_2=CFO-Rf$, $CF_2=CFCF_2O-Rf$, $CH_2=CFO-Rf$, $CH_2=CFCF_2O-Rf$, $CF_2=CHO-Rf$, $CF_2=CHCF_2O-Rf$ wherein to the oxygen atom is bonded the carbon atom in Rf.

The fluorine-containing polymers prepared from those fluorine-containing allyl ether and fluorine-containing vinyl ether monomers are polymerization products prepared from ethylenic monomers and therefore, have high strength. Also since those monomers are copolymerizable with fluoroolefins such as tetrafluoroethylene, vinylidene fluoride and chlorotrifluoroethylene which are monomers providing the structural units A1 and A, there can be obtained polymers having oxidation resistance and being stable electrochemically. Particularly when vinylidene fluoride is used as copolymerizable component, a dielectric constant of the polymer can be increased, and dissociation of ion of electrolytic salt can be enhanced.

Also the monomers such as $CH_2=CHO-Rf$, $CH_2=CFCF_2O-Rf$ and $CF_2=CHO-Rf$, wherein to the oxygen atom is bonded the carbon atom in Rf, are solely polymerizable and are particularly desirable. Among them, particularly $CH_2=CFCF_2O-Rf$ is high in homo-polymerizability and is preferred from the viewpoint of dielectric constant.

In the structural unit M-2, examples of the monomer in the case of c=0 are, for instance, $CH_2=CH-Rf$, $CH_2=CHCH_2-Rf$, $CF_2=CF-Rf$, $CF_2=CFCF_2-Rf$, $CH_2=CF-Rf$, $CH_2=CFCF_2-Rf$, $CF_2=CH-Rf$ and the like, wherein Rf is as defined above.

The polymers prepared from those monomers have high strength and excellent oxidation resistance like the polymers mentioned above.

Examples of the monomer providing the ester type structural unit M-3 are, for instance, $CH_2=CHCOO-Rf$, $CH_2=C(CH_3)COO-Rf$ and $CH_2=CFCOO-Rf$, wherein Rf is as defined above. Those monomers are particularly desirable because polymerizability is good, strength of the obtained polymer is high, and ion dissociation of the electrolytic compound can be enhanced because polarizable carbonyl group is contained.

Also particularly desirable examples of the monomer providing the structural unit M-4 having an aromatic ring are styrene derivatives and α-methyl styrene derivatives because polymerizability thereof is good, and obtained polymers have high strength and are excellent in electrochemical and thermal stability.

Examples of the structure of the structural unit M-4 are:

[Four styrene/α-methyl styrene derivative structures with aromatic rings bearing $CO-Rf$ or $CH_2O-Rf$ substituents, two with $CH_3$ groups on the vinyl]

and the like, wherein Rf is as defined above, which are derived from:

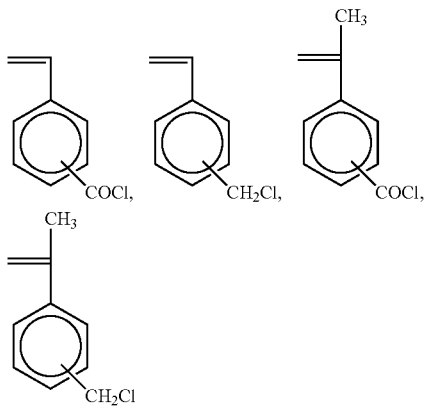

and the like.

The above-mentioned monomers providing the structural units M-3 and M-4 are desirable because excellent polymerizability is exhibited.

Rf is a fluorine-containing alkyl group having 2 to 100 carbon atoms which has ether bond and contains the structural unit (D) in its chain. The polar nonionic functional group may be contained or may not be contained in Rf.

Preferred Rf are fluorine-containing alkyl groups which have ether bond and 2 to 50 carbon atoms, more preferably 2 to 20 carbon atoms, and desirably contain the structural unit (D) in the chain thereof. If the number of carbon atoms exceeds 50, there is a case where miscibility with the electrolytic material (II) is lowered and mechanical properties are lowered.

The functional group which can be contained in Rf is the polar nonionic functional group Y. Examples thereof are mentioned infra. An obtained effect differs depending on kind of the functional group, and therefore, the functional group may be selected by a desired effect.

When the structural unit M1 contains the polar nonionic functional group Y, it is particularly preferable, from the viewpoint of enhancement of ion-conducting property, that the functional group Y is contained in the side chain in the form of structural unit D1 represented by the formula (D1):

$$-D-(R^1)_{n5}-(Y)_{n6} \quad (D1)$$

wherein $R^1$ is a di-, tri- or tetra-valent organic group; Y is a polar nonionic functional group; n5 is 0 or 1; n6 is an integer of from 1 to 3; D is as defined supra.

Also when the structural unit M1 is the above-mentioned structural unit M-1, M-2, M-3 or M-4, Rf is preferably $Rf^4$, wherein $Rf^1$ is a fluorine-containing monovalent organic group having 2 to 100 carbon atoms which has 1 to 4 structural units D1.

Examples of D1 are:

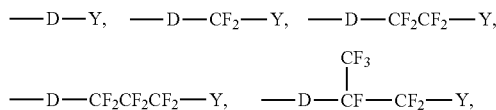

(n is an integer of from 2 to 5)

$$-D-CH_2CHCH_2-Y$$
$$\quad\quad\quad\quad\quad |$$
$$\quad\quad\quad\quad\quad Y$$

and the like, wherein Y are the same or different and each is a polar nonionic functional group.

Examples of Rf having no polar nonionic functional group Y are:

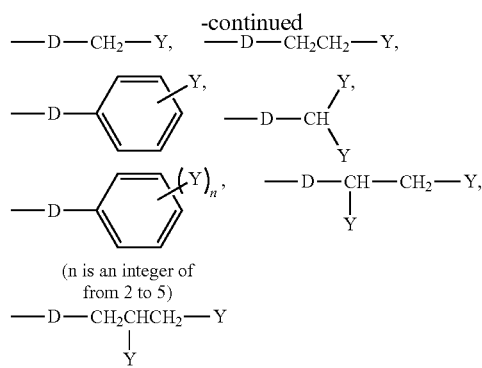

and the like, wherein n1, n2, n3 and n4 are the same or different and each is an integer of from 1 to 4, and n1+n2+n3+n4 is an integer of 4 or less.

Examples of $Rf^1$ are:

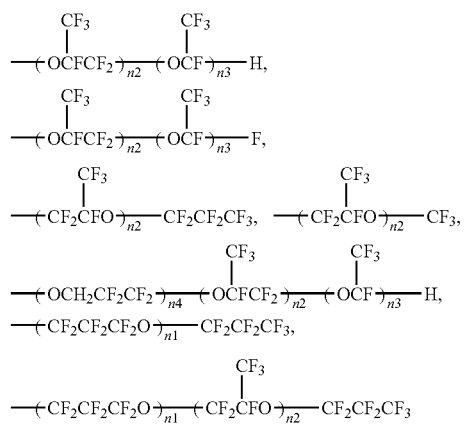

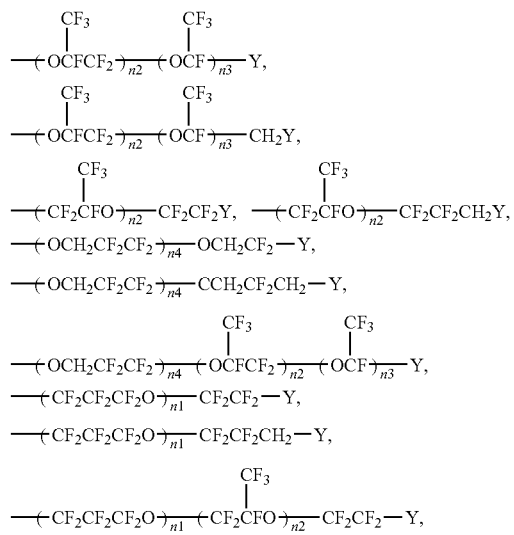

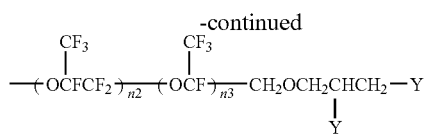

and the like, wherein n1, n2, n3 and n4 are the same or different and each is an integer of from 1 to 4, and n1+n2+n3+n4 is an integer of 4 or less. Those $Rf^1$ are preferred from the viewpoint of enhancement of ion-conducting property, oxidation resistance and mechanical properties.

Explained below is the polar nonionic functional group Y contained in the non-crystalline fluorine-containing polymer (I) used in the present invention.

The polar nonionic functional group Y introduces a moiety having high polarizability to the fluorine-containing polymer (I), and can exhibit various effects such as enhancement of stability of electrolytic salt, affinity for electrolytic salt, ion-conducting property, property of holding an organic solvent when the solvent is used and further adhesion to an electrode.

The polar nonionic functional group Y is a functional group which does not cause ion dissociation in a system where the composition contains the electrolytic compound (II) of the present invention and as case demands, an organic solvent or water. Namely, The polar nonionic functional group Y is a functional group which does not have a structure such as —O⁻M⁺. Examples thereof are, for instance, hydroxyl group, carboxylic acid esters, sulfonic acid esters, phosphoric acid esters, carboxylic acid amides, sulfonic acid amides, phosphoric acid amides, carboxylic acid imides, sulfonic acid imides, phosphoric acid imides, carbonates, nitriles, amines, hydroxylamines, amidines, hydrazines, oximes, carbamates, ureas, imines, amine oxides, glycidyl group, epoxy group, oxetane group, alkoxysilyl group, nitro group, nitrile group, amino group, acid chloride group, acid fluoride group, vinyl group, allyl group, methacryloyl group, α-fluoroacryloyl group, acryloyl group and the like.

Particularly when a nonionic functional group having high polarity is used, a dielectric constant of the fluorine-containing polymer can be increased to accelerate ion dissociation and to enhance ion-conducting property.

It is preferable that the polar nonionic functional group Y is a functional group which has any of atomic groups such as:

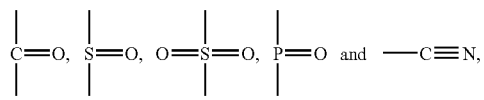

from the viewpoint of enhancement of ion-conducting property and stability of the electrolytic salt.

Examples of the nonionic functional group having such effects as mentioned above are hydroxyl group, carboxylic acid esters, sulfonic acid esters, phosphoric acid esters, carboxylic acid amides, sulfonic acid amides, phosphoric acid amides, carboxylic acid imides, sulfonic acid imides, phosphoric acid imides, carbonates, nitriles, amines, hydroxylamines, amidines, hydrazines, oximes, carbamates, ureas, imines, amine oxides, nitrile group, amino group and the like.

Particularly preferred is at least one selected from the group consisting of hydroxyl group, carboxylic acid esters, sulfonic acid esters, phosphoric acid esters, carboxylic acid amides, sulfonic acid amides, phosphoric acid amides, carboxylic acid imides, sulfonic acid imides, phosphoric acid imides, carbonates, nitrites, amines, hydroxylamines, amidines, hydrazines, oximes, carbamates, ureas, imines and amine oxides.

Preferred examples of an end group having the polar nonionic functional group Y are, for instance,
$CH_3OCO—CF_2—$, $CH_3OCO—CH_2—$, $CH_3OCO—CF_2CF_2CF_2—CH_2$, $CH_3OCO—(CF_2CF_2)_2—CH_2$, $CH_3COO—CH_2CH_2(OCH_2CH_2)_5—O—$, $CH_3COO—CH(CH_3)CH_2(OCH(CH_3)CH_2)_5—O—$, $CH_3OCOO—CF_2—$, $CH_3OCOO—CH_2—$, $CH_3OCOO—CF_2CF_2—CH_2—$, $CH_3OCOO—(CF_2CF_2)_2—CH_2—$, $H_2N—CF_2CF_2—CO—$, $NC—CF_2CF_2—CO—$, $NC—(CF_2CF_2)_2—CO—$, $H_2NSO_2—CF_2CF_2—O—$, $H_2NSO_2—CF_2CF_2OCF_2CF_2—O—$, $H_2NCO—CH_2CH_2—O—$, $H_2NCO—CF_2—CF_2—CH_2—O—$
and the like.

The polymer solid electrolyte of the present invention is not intended for single ion conductor only, and therefore, it is desirable that the fluorine-containing polymer (I) itself has a structure (polymer of the formula (1)) containing no ionic functional group substantially. If the number of ionic functional groups is increased, the polymer becomes a polymer anion, and there is a case where an adverse effect is produced on ion-conducting property of the electrolytic compound (II) in the polymer solid electrolyte.

The optional structural unit A1 in the formula (1) is the same as the essential structural unit A2 in the formula (2) when having the polar nonionic functional group Y, and is the same as the optional structural unit A when not having the polar nonionic functional group Y.

Namely, the non-crystalline fluorine-containing polymer (I) having the polyether chain D and the polar nonionic functional group Y can be in the form of:

-(M1)—(The polar nonionic functional group Y is contained in the structural unit M1)

-(M1)-(A1)—(The polar nonionic functional group Y is contained only in the structural unit M1. A=A1)

-(M1)-(A1)—(The polar nonionic functional groups Y are contained in the structural units M1 and A1. A1=A2, A=0)

-(M1)-(A1)-(A)—(The polar nonionic functional groups Y are contained in the structural units M1 and A1.)

-(M2)-(A2)—(The polar nonionic functional group Y is contained only in the structural unit A2. A=0)

-(M2)-(A2)-(A)—(The polar nonionic functional group Y is contained only in the structural unit A2.)

In the fluorine-containing polymer (I) of the solid electrolyte of the present invention, it is preferable that the total amount of the structural units (M1 or M2) having the structure D in its side chain is not less than 5% by mole, preferably not less than 10% by mole, more preferably not less than 30% by mole, further preferably not less than 50% by mole based on the whole structural units constituting the fluorine-containing polymer. When the structure D is contained within this range, ion-conducting property of the electrolytic compound becomes good.

On the other hand, in the fluorine-containing polymer (I), it is preferable that the total amount of the structural units (those having Y among M1, A1 and A2) having the polar nonionic functional group Y is not less than 1% by mole, preferably not less than 5% by mole, more preferably not less than 10% by mole, further preferably not less than 40% by mole based on the whole structural units constituting the fluorine-containing polymer. When the polar nonionic functional group Y is contained within this range, stability and ion-conducting property of the electrolytic compound becomes good.

Among the structural units M1 having the structure D, one having the polar nonionic functional group Y is assumed to be M1a, the fluorine-containing polymers represented by the formulae (1) and (2) are concretely fluorine-containing polymers represented by the following formulae (6) to (9) and the fluorine-containing polymer represented by the formula (2).
Fluorine-containing polymer of the formula (6):

wherein M1a and A are as defined above, and the structural units M1a and A are contained in amounts of from 1 to 100% by mole and from 0 to 99% by mole, respectively. The content of structural unit M1a is preferably not less than 10% by mole, more preferably not less than 30% by mole, further preferably not less than 50% by mole.
Fluorine-containing polymer of the formula (7):

wherein M1a, M2 and A are as defined above, and the structural units M1a, M2 and A are contained in amounts of from 1 to 99% by mole, from 1 to 99% by mole and from 0 to 98% by mole, respectively. The content of structural unit M1a is preferably not less than 5% by mole, more preferably not less than 10% by mole, further preferably not less than 40% by mole. The total content M1a+M2 of structural units M1a and M2 is preferably not less than 10% by mole, more preferably not less than 30% by mole, further preferably not less than 50% by mole.
Fluorine-containing polymer of the formula (8):

wherein M1a, A2 and A are as defined above, and the structural units M1a, A2 and A are contained in amounts of from 1 to 99% by mole, from 1 to 99% by mole and from 0 to 98% by mole, respectively. The content of structural unit M1a is preferably not less than 5% by mole, more preferably not less than 10% by mole, further preferably not less than 40% by mole. The total content M1a+A2 of structural units M1a and A2 is preferably not less than 10% by mole, more preferably not less than 30% by mole, further preferably not less than 50% by mole.
Fluorine-containing polymer of the formula (9):

wherein M1a, M2, A2 and A are as defined above, and the structural units M1a, M2, A2 and A are contained in amounts of from 1 to 98% by mole, from 1 to 98% by mole, from 1 to 98% by mole and from 0 to 97% by mole, respectively. The total content M1a+M2 of structural units M1a and M2 is preferably not less than 10% by mole, more preferably not less than 30% by mole, further preferably not less than 50% by mole. The total content M1a+A2 of structural units M1a and A2 is preferably not less than 5% by mole, more preferably not less than 10% by mole, further preferably not less than 40% by mole.
Fluorine-containing polymer of the formula (2):

wherein M2, A2 and A are as defined above, and the structural units M2, A2 and A are contained in amounts of from 1 to 99% by mole, from 1 to 99% by mole and from 0 to 98% by mole, respectively. The content of structural unit M2 is preferably not less than 10% by mole, more preferably not less than 30% by mole, further preferably not less than 50% by mole. The content of structural unit A2 is preferably not less than 5% by mole, more preferably not less than 10% by mole, further preferably not less than 40% by mole.

Explained below are firstly the structural unit A1 (=A2) having the polar nonionic functional group Y and then the structural unit A1 (=A) having no polar nonionic functional group Y.

The monomers providing the structural unit A1 (=A2) having the polar nonionic functional group Y may be monomers copolymerizable with the monomers providing the structural unit M1 (or M2).

Examples thereof are $CH_2=CH-Y$, $CF_2=CF-Y$, $CF_2=CH-Y$, $CH_2=CF-Y$, $CH_2=CH-Rf-Y$ (Rf is a fluorine-containing alkylene group having 1 to 40 carbon atoms), $CF_2=CF-Rf-Y$ (Rf is as defined above),

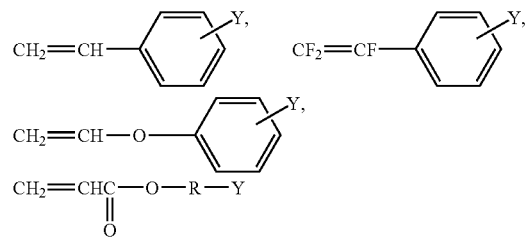

(R is a divalent hydrocarbon group having 1 to 20 carbon atoms), $CH_2=CH-R-Y$ (R is as defined above),

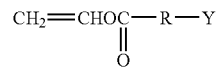

(R is as defined above), and the like.

Among them, preferred are $CH_2=CH-Y$, $CF_2=CF-Y$, $CF_2=CH-Y$, $CH_2=CF-Y$, $CH_2=CH-Rf-Y$ (R is as defined above), $CF_2=CF-Rf-Y$ (Rf is as defined above),

and the like, from the viewpoint of enhancement of oxidation resistance and ion-conducting property.

The monomers providing the structural unit A1 (=A) having no polar nonionic functional group Y may be monomers copolymerizable with the monomers providing the structural unit M1 (and further M2 and A2 in the formula (2)).

Generally preferred are monomers represented by the following formulae (4) and (5).
Olefins which contain or do not contain fluorine atom and are represented by the formula (4):

wherein $X^8$, $X^9$, $X^{10}$ and $X^{11}$ are the same or different and each is H, F, Cl, $CH_3$ or $CF_3$.
Ethylenic monomers which contain or do not contain fluorine atom and are represented by the formula (5):

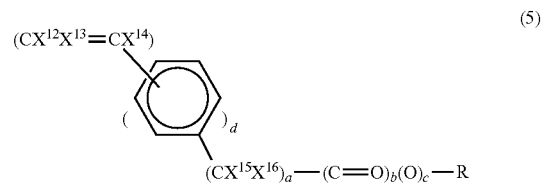

wherein $X^{12}$ and $X^{13}$ are the same or different and each is H or F; $X^{14}$ is H, F, $CH_3$ or $CF_3$; $X^{15}$ and $X^{16}$ are the same or different and each is H, F or $CF_3$; R is a monovalent organic group which has neither the structural unit D (or D1) nor an ionic functional group; a is 0 or an integer of from 1 to 3; b, c and d are the same or different and each is 0 or 1.

Examples of the olefins represented by the formula (4) are, for instance, ethylene, propylene, vinyl chloride, vinylidene chloride, monofluoro vinyl, vinylidene fluoride, trifluoroethylene, tetrafluoroethylene, hexafluoropropylene, chlorotrifluoroethylene and the like.

The monomers represented by the formula (4) are suitable as the monomers for the structural unit A1 (A) because of good polymerizability with the monomers for the structural unit M1 (M2). Particularly preferred are fluorine-containing olefins such as tetrafluoroethylene, vinylidene fluoride, trifluoroethylene and chlorotrifluoroethylene.

The monomers represented by the formula (5) are suitable as the monomers for the structural units A1 (A) because of good polymerizability with the monomers for the structural units M1 (M2). Particularly preferred are acryl, methacryl, allylether and styrene derivatives such as:

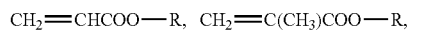

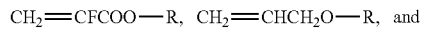

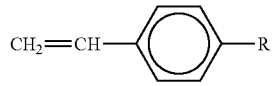

wherein R is explained below.

In the above-mentioned formulae, R is a monovalent organic group which has neither the structural unit D (or D1) nor a polar nonionic functional group and may be an optional one. It is desirable that R is an alkyl group having ether bond for enhancing ion-conducting property, and is a bulky group such as aryl group, cyclohexyl group or adamantyl group for increasing strength.

A molecular weight of the non-crystalline fluorine-containing polymer (I) of the present invention varies depending on kinds of the non-crystalline fluorine-containing polymer and electrolytic compound (II) and is optionally selected. For example, an average degree of polymerization of the fluorine-containing polymer is from 5 to 10,000. A number average molecular weight of the polymer is not less than 500, preferably not less than 5,000, particularly preferably not less than 10,000 and not more than 20,000,000, preferably not more than 5,000,000, particularly preferably not more than 1,000,000. Preferred molecular weight is selected within the above-mentioned range.

Concretely in the composition comprising the fluorine-containing polymer (I) and the electrolytic compound (II), a preferred molecular weight of the polymer is so selected as to set a viscosity of the composition which gives excellent ion-conducting property. Generally it is preferable to set a viscosity of the composition comprising (I) and (II) low. The viscosity is preferably not more than 500 Pa·s, further preferably not more than 100 Pa·s, particularly preferably not more than 50 Pa·s, and the lower limit thereof is preferably 0.01 Pa·s, further preferably 0.05 Pa·s, particularly preferably 0.1 Pa·s.

The fluorine-containing polymers (I) represented by the formulae (1) and (2) are prepared by polymerization of the ethylenic monomer for the structural unit M1 or M2 with the ethylenic monomer for the structural unit A, A1 or A2. For the polymerization, a suitable known polymerization method may be selected from cation polymerization, radical polymerization, anion polymerization and the like. From the viewpoint of being easily applicable industrially, radical polymerization is desirable. Radical polymerization initiator can be optionally selected from azo compounds, inorganic peroxides, organic peroxides, light, electron, radiation and the like. The polymerization can be carried out by an optional method such as solution polymerization, bulk polymerization, emulsion polymerization and suspension polymerization.

In the present invention, a polymer which has both of a unit having the structural unit D in its trunk chain and a unit having the structural unit D in its side chain may be used as the fluorine-containing polymer (I). Also the fluorine-containing polymer (I) may further contain, in its trunk chain, a fluorine-containing ether unit, in which n1+n2+n3+n4 is more than five in the structural unit D.

The solid electrolyte of the present invention is basically formed into a solid state only by the fluorine-containing polymer (I). However there may be employed, as means for increasing strength of the fluorine-containing polymer (I), a method of making a composite polymer in combination with other high strength polymer, a method of mixing with insulating ceramics, a method of mixing with an ionic conducting inorganic compound and the like (JP63-102104A, JP8-148163A, JP6-140051A, JP11-35765A, etc.).

However in the case of composite polymers containing ceramics or an ionic conducting inorganic compound, a step for equalizing a particle size of particles of ceramics and inorganic salt is required separately in order to uniformly disperse the particles in the solid electrolyte.

It is desirable that the fluorine-containing polymer is mixed with a polymer which does not have such disadvantages. It is preferable that a matrix polymer to be mixed is a polymer having a number average molecular weight of from 10,000 to 1,000,000 and obtained from a monomer represented by the formula:

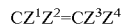

wherein $Z^1$, $Z^2$, $Z^3$ and $Z^4$ are the same or different and each is hydrogen atom, halogen atom, $CH_3$ or $CF_3$.

Further desired are homopolymers or copolymers which are obtained from ethylene, propylene, tetrafluoroethylene, vinylidene fluoride, chlorotrifluoroethylene, monofluoroethylene and hexafluoropropylene and have a number average molecular weight of from 10,000 to 1,000,000. If the number average molecular weight is less than 10,000, there is a problem with strength, and if the number average molecular weight exceeds 1,000,000, moldability is lowered. The number average molecular weight is desirably from 50,000 to 500,000. Also porous polymers are desired from the viewpoint of miscibility with the fluorine-containing polymer.

Particularly desirable are polytetrafluoroethylene, polyvinylidene fluoride, vinylidene fluoride/hexafluoropropylene copolymer and porous polymers thereof.

Those fluorine-containing polymers are excellent in durability. Also polyvinylidene fluoride and vinylidene fluoride/hexafluoropropylene copolymer have advantages such as high dielectric constant and excellent property of holding an electrolytic solution.

With respect to a weight ratio of the fluorine-containing polymer to the mentioned matrix polymer, it is desirable that the former is contained in an amount of from 10 to 99 parts by weight and the latter is contained in an amount of from 1 to 90 parts by weight. If amount of the former is less than 10 parts by weight, characteristics of the fluorine-containing polymer cannot be used effectively, and if the amount of the latter is less than 1 part by weight, an effect of increasing strength cannot be recognized. It is further desirable that the fluorine-containing polymer is contained in an amount of from 20 to 80 parts by weight, and the matrix polymer is contained in an amount of from 20 to 80 parts by weight.

The non-crystalline fluorine-containing polymer (I) having a specific fluorine-containing ether structural unit is as explained above, and the present invention relates to the solid electrolyte basically comprising the mentioned fluorine-containing polymer (I) and the electrolytic compound (II).

When the fluorine-containing polymer (I) itself is in the solid form, the solid electrolyte (so-called totally solid electrolyte) can be produced by mixing the electrolytic compound (II) without using a solvent.

Namely, the first of the present invention relates to the solid electrolyte comprising (I) the mentioned non-crystalline fluorine-containing polymer having the polar nonionic functional group and the structural unit D and (II) the electrolytic compound.

In the present invention, the concept of "solid electrolyte" means an electrolyte in a state having no flowability, and encompasses electrolytes in a completely solidified, rubber-like and gel-like forms. While those forms can be obtained only by the non-crystalline fluorine-containing polymer, the concept also encompasses use of various additives (for example, the mentioned matrix polymer, electrolytic compound, etc.) for making "solid" form.

Also when the non-crystalline fluorine-containing polymer (I) is in the solidified form or in the rubber-like form, a solvent may be mixed to make the polymer in the form of gel. When the non-crystalline fluorine-containing polymer (I) is in the form of liquid or gel, the matrix polymer may be mixed for reinforcement or a thickener may be added to make the polymer in the form of gel or in the solidified form.

The electrolytic compound (II) can undergo ionic dissociation and ion transfer, and encompasses acids (IIa) such as inorganic acids and organic acids, inorganic salts and organic salts (IIb) obtained by neutralizing the acids (IIa), ionic polymers or salts thereof (IIc) (polymer anions) and further liquid ionic compounds (IId). The acids and liquid ionic compounds can be used as an electrolytic compound since the acids exhibit a high degree of proton transfer and the liquid ionic compounds exhibit high ionic conductivity.

Examples of the electrolytic compound (II) are as follows.

(IIa) Acids

There are exemplified inorganic acids such as tetrafluoroboric acid, hexafluorophosphoric acid, perchlorates, hexafluoroarsenic acid, nitric acid, sulfuric acid, phosphoric acid, hydrofluoric acid, hydrochloric acid, hydrobromic acid, hydroiodic acid and thiocyanic acid; and organic acids such as trifluoromethanesulfonic acid, pentafluoroethanesulfonic acid, heptafluoropropylsulfonic acid, bis(trifluoromethanesulfonyl)imidic acid, acetic acid, trifluoroacetic acid, propionic acid, benzenesulfonic acid, toluenesulfonic acid, n-hexanesulfonic acid, n-octylsulfonic acid, cetylsulfonic acid, p-chlorobenzenesulfonic acid, phenolsulfonic acid, 4-nitrotoluene-2-sulfonic acid, 2-sulfobenzoic acid, nitrobenzenesulfonic acid, sulfosuccinic acid and sulfosebasic acid. Particularly preferred are strong acids such as nitric acid, sulfuric acid, hydrochloric acid and fluorine-containing alkylsulfonic acid.

(IIb) Salts

There are preferably compounds comprising at least one cation selected from the group consisting of metal cation, ammonium ion, amidinium ion and guadinium ion and at least one anion selected from the group consisting of chlorine ion, bromine ion, iodine ion, perchlorate ion, thiocyanic acid ion, tetrafluoroborate ion, nitric acid ion, carbonic acid ion, sulfuric acid ion, hypochlorous acid ion, $AsF_6^-$, $PF_6^-$, stearylsulfonic acid ion, octylsulfonic acid ion, dodecylbenzenesulfonic acid ion, naphthalenesulfonic acid ion, dodecylnaphthalenesulfonic acid ion, $R^4SO_3^-$, $(R^4SO_2)(R^5SO_2)N^-$, $(R^4SO_2)(R^5SO_2)(R^6SO_2)C^-$ and $(R^4SO_2)(R^5SO_2)TC^-$, wherein $R^4$, $R^5$ and $R^6$ are halogen-substituted alkyl groups or aryl groups, T represents an electron attractive group.

It is particularly preferable that $R^4$, $R^5$ and $R^6$ in the anion are the same or different and each is a perfluoroaryl group or perfluoroalkyl group having 1 to 6 carbon atoms, and the electron attractive group T is nitro group, nitroso group, carbonyl group, carboxyl group, cyano group or trialkylammonium salt.

Further there are concretely inorganic salts obtained by neutralizing inorganic acids such as tetrafluoroboric acid, hexafluorophosphoric acid, perchlorates, hexafluoroarsenic acid, nitric acid, sulfuric acid, phosphoric acid, hydrofluoric acid, hydrochloric acid, hydrobromic acid, hydroiodic acid and thiocyanic acid; and organic salts obtained by neutralizing organic acids such as trifluoromethanesulfonic acid, pentafluoroethanesulfonic acid, heptafluoropropylsulfonic acid, bis(trifluoromethanesulfonyl)imidic acid, acetic acid, trifluoroacetic acid, propionic acid, benzenesulfonic acid, toluenesulfonic acid, n-hexanesulfonic acid, n-octylsulfonic acid, cetylsulfonic acid, p-chlorobenzenesulfonic acid, phenolsulfonic acid, 4-nitrotoluene-2-sulfonic acid, 2-sulfobenzoic acid, nitrobenzenesulfonic acid, sulfosuccinic acid and sulfosebasic acid.

Also it is preferable that the cation is at least one selected from the group consisting of hydrogen ion, lithium ion, sodium ion, potassium ion, cesium ion, magnesium ion, calcium ion and barium ion.

(IIc) Ionic Polymers or Salts Thereof (Polymer Anions)

Also there can be used compounds comprising a polymer anion and a cation selected from the group consisting of hydrogen ion, metal cation, ammonium ion, amidinium ion and guadinium ion.

Namely, there can be used, as an electrolytic compound, not only the above-mentioned low molecular weight electrolytes but also ionic polymers having an ionic functional group or salts thereof (polymer anion).

Namely, polymers having —COO⁻ or —SO₃⁻ in the side chain thereof can be used as a polymer anion. There are preferably exemplified polymers having an anionic functional group such as —SO₃⁻ or —COO⁻ particularly at an end of the polymer side chain, concretely polyacrylic acid, polymethacrylic acid, polyphosphoric acid, sulfonated polystyrene, sulfonated polyethylene, polyvinylsulfonic acid and the like. Preferred are fluorine-containing polymers, particularly perfluoro polymers having —SO₃⁻ or —COO⁻, for example, a copolymer of TFE and perfluoro vinyl ether having —SO₃⁻ group, a copolymer of TFE and perfluoro vinyl ether having —COO⁻ group, and the like. Known as commercially available polymers are FLEMION® and NAFFION® available from du Pont.

Examples of the cations of those polymers are hydrogen ion, metal cation, ammonium ion, amidinium ion and guadinium ion.

(IId) Liquid Ionic Compounds

Not only liquid ionic compounds being in the liquid form but also compounds in the solid form obtained by combining the liquid ionic compounds with a polymer can be used, and various known liquid ionic liquids can be used (Nature, 362,137, (1993), Journal of Chemical Society Chemical Communication, 929, (1993)). Concretely onium salts of cyclic amidines or pyridines are desirable.

Preferred kind of the electrolytic compound (II) varies depending on applications. For example, in the case of use for an electrolyte for lithium battery, $LiClO_4$, $LiAsF_6$, $LiBF_4$, $LiPF_6$, $LiCF_3SO_3$, $LiC_4F_9SO_3$, $LiN(CF_3SO_2)_2$, $LiN(C_2F_5SO_2)_2$, $LiC(CF_3SO_2)_2$ and $LiC(C_2F_5SO_2)_2$ are selected. In the case of use for an electrolyte for fuel cell, there are trifluoroacetic acid, trifluoromethylsulfonic acid, pentafluoroethanesulfonic acid, heptafluoropropylsulfonic acid, sulfonated styrene, methylsulfonic acid, ethylsulfonic acid, polymers having an anionic functional group such as $—SO_3^-$ or $—COO^-$ at an end of side chain thereof and the like.

Also in the case of use for an electrolyte for capacitors, in a system using an electrolyte prepared using water or protonic organic solvent, generally strong acids or alkali metal salts of strong acids are suitable. Those acids and salts are preferred because of excellent ion dissociation property in water or protonic solvent. In this case, examples of the strong acid are inorganic strong acids such as nitric acid and sulfuric acid and organic sulfonic acids, particularly fluorine-containing alkylsulfonic acids. Examples of the organic sulfonic acids are trifluoromethanesulfonic acid, pentafluoroethanesulfonic acid, heptafluoropropylsulfonic acid, benzenesulfonic acid, toluenesulfonic acid, p-chlorobenzenesulfonic acid and nitrobenzenesulfonic acid. Examples of the metal salts of strong acids are lithium salts, sodium salts and potassium salts of the above-mentioned acids and hydrochloric acid.

In a system using an electrolyte prepared by using an aprotic organic solvent, in many cases, salts of weak acids, particularly organic salts of weak acids are generally used. Examples thereof are salts comprising an anion such as iodine ion, tetrafluoroboron ion, $BF_4^-$, $PF_6^-$, $(CF_3SO_2^-)_2C^-$, $(C_4F_9SO_2^-)_2C^-$, $(CF_3SO_2^-)_2N^-$ or $(C_2F_5SO_2^-)_2N^-$ and a cation such as ammonium ion, amidinium ion or guadinium ion. Particularly ammonium salts of tetrafluoroboron ion are often used.

Examples of the electrolytic compound for solid display devices are the same as electrolytes used for capacitors. Generally electrolytes produced using an organic solvent are used, and therefore in many cases, the above-mentioned organic salts of weak acids are used.

Also the same electrolytic compounds as in the electrolytes for capacitors are used for sensors. Generally in many cases, water is used as a solvent, and therefore metal salts of strong acids, particularly alkali metal salts of inorganic strong acids are often used.

In the case of totally solid polymer electrolytes produced without using a solvent, ionic conductivity greatly fluctuates depending on kind of an electrolytic compound to be used. For example, when a liquid electrolytic compound such as the liquid ionic compound (IId) or a liquid acid is used, sufficient ionic conductivity can be obtained even at room temperature. Also even in the case of solid acids or salts, acids having high acidity (pKa of 2 or less) or salts having high ion dissociation property are preferred since ionic conductivity is increased.

However when using salts such as inorganic salts or organic salts, generally in many cases, a solvent is added to prepare a fluorine-containing polymer solid electrolyte in the form of gel in order to obtain more practicable ionic conductivity.

In a system using an electrolyte prepared using water or a protonic organic solvent as a solvent, generally strong acids or alkali metal salts of strong acids are suitable. Those acids and salts are preferred because of excellent ion dissociation property in water or protonic organic solvent. In this case, examples of the inorganic strong acids are nitric acid and sulfuric acid and examples of the organic strong acids are organic sulfonic acids, particularly fluorine-containing alkylsulfonic acids. Examples of the organic strong acids are trifluoromethanesulfonic acid, pentafluoroethanesulfonic acid, heptafluoropropylsulfonic acid, benzenesulfonic acid, toluenesulfonic acid, p-chlorobenzenesulfonic acid and nitrobenzenesulfonic acid. Examples of the alkali metal salts of strong acids are lithium salts, sodium salts and potassium salts of the above-mentioned acids and hydrochloric acid. Hydrochloric acid has strong corrosive property, and therefore are rarely used as an acid but often used as an alkali metal salt.

Also in a system using an electrolyte prepared using an aprotic organic solvent as a solvent, generally there are many systems where presence of proton is not desirable, and an acid is not used. The above-mentioned alkali metal salts of strong acids which are used in water or a protonic organic solvent are low in solubility in an aprotic organic solvent and a concentration therein cannot be increased, and therefore those alkali metal salts are not used generally. Accordingly when an aprotic organic solvent is used, salts of weak acids are used in many cases. Also particularly organic salts of weak acids being excellent in solubility or salts of organic weak acids are used in many cases. Examples thereof are salts comprising an anion such as iodine ion, tetrafluoroborate ion, $BF_4^-$, $PF_6^-$, $(CF_3SO_2^-)C^-$, $(C_4F_9SO_2^-)C^-$, $(CF_3SO_2)_2N^-$ or $(C_2F_5SO_2)_2N^-$ and a cation such as ammonium ion, amidinium ion or guadinium ion. Particularly ammonium salts of tetrafluoroborate ion are often used. Also there is a case where lithium or sodium salts of organic weak acids such as $(CF_3SO_2^-)C$, $(C_4F_9SO_2^-)C$, $(CF_3SO_2)_2N^-$ and $(C_2F_5SO_2)_2N^-$ are used.

With respect to the proportion of the electrolytic compound (II) to the fluorine-containing polymer (I), the amount of (II) is from 0.01 to 100 parts by weight based on 100 parts by weight of (I). If the amount of (II) is less than 0.01 part by weight, a salt concentration is too low and ion-conducting property cannot be obtained. Also if the amount of (II) exceeds 100 parts by weight, a salt concentration is too high and polymer movement is significantly blocked and therefore ion-conducting property cannot be obtained.

In the solid electrolyte of the present invention, there are employed various combinations of the non-crystalline fluorine-containing polymer (I) having the polar nonionic functional group and the structural unit D with the electrolytic compound (II) depending on kind of the functional group in the fluorine-containing polymer (I), glass transition temperature and tackiness of the fluorine-containing polymer, form of the electrolytic compound (II) and kind of anion species and cation species. Among them, when combining a specific fluorine-containing polymer (Ib) having hydroxyl group with at least one electrolytic compound (IIc) selected from ionic polymers or salts thereof, significant effects can be obtained from the viewpoint of setting high structural molecular motion (flexibility) of the fluorine-containing polymer (I), excellent proton conductivity due to introduction of OH group, excellent oxidation resistance and heat resistance, and excellent miscibility of the fluorine-containing polymer (I) with the electrolytic compound (II).

Namely, the present invention relates to the fluorine-containing polymer solid electrolyte (the fourth invention) which has an ionic conductivity of from $10^{-10}$ to $10^1$ S/cm measured at 25° C. by an alternating current complex impedance method and comprises:

(Ib) a non-crystalline fluorine-containing polymer having hydroxyl group which has a number average molecular weight of from 500 to 1,000,000, has recurring units having, in a side chain thereof, a structural unit D derived from a fluorine-containing ether and represented by the formula (D):

$$-(d1)_{n1}-(d2)_{n2}-(d3)_{n3}-(d4)_{n4}-$$

wherein
(d1) is —(OCF$_2$CF$_2$CF$_2$)—,
(d2) is —(OCFX$^1$CF$_2$)— or —(OCF$_2$CFX$^1$)—,
(d3) is —(OCFX$^2$)—,
(d4) is —(OCH$_2$CF$_2$CF$_2$)— or —(OCF$_2$CF$_2$CH$_2$)—;
n1, n2, n3 and n4 are the same or different and each is 0 or an integer of 1 or more, n1+n2+n3+n4 is an integer of from 1 to 4; X$^1$ and X$^2$ are the same or different and each is F or CF$_3$; in the side chain, two or more structural units (D) are not bonded continuously to each other, and is represented by the formula (Ib):

-(M1b)-(A)-           (1b)

wherein the structural unit M1b is a structural unit derived from a fluorine-containing ethylenic monomer (m1b) having hydroxyl group and represented by the formula (M1b-2):

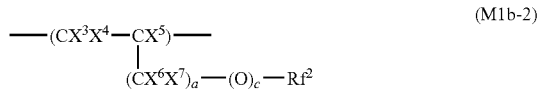
(M1b-2)

wherein X$^3$ and X$^4$ are the same or different and each is H or F; X$^5$ is H, F, CH$_3$ or CF$_3$; X$^6$ and X$^7$ are the same or different and each is H, F or CF$_3$; Rf$^2$ is a fluorine-containing monovalent organic group having hydroxyl group which has 2 to 100 carbon atoms and 1 to 4 structures of the formula (D1b):

(D1b)

wherein R$^1$ is a di-, tri- or tetra-valent organic group; n5 is 0 or 1; n6 is an integer of from 1 to 3; D is as defined in the formula (D), and two or more structural units (D) are not bonded continuously to each other; a is 0 or an integer of from 1 to 3; c is 0 or 1;
the structural unit A is a structural unit derived from a monomer (a) copolymerizable with the monomer (m1b), and
the structural units M1b and A are contained in amounts of from 1 to 100% by mole and from 0 to 99% by mole, respectively, and
(IIc) at least one selected from ionic polymers and salts thereof.

In the fluorine-containing polymer (Ib) having hydroxyl group, it is preferable that in the formula (1b), the structural unit M1b is a structural unit derived from a fluorine-containing ethylenic monomer having hydroxyl group and represented by the formula (M1b-2a):

(M1b-2a)

wherein Rf$^2$ is the same as Rf$^2$ in the formula (M1b-2), because homo-polymerizability or copolymerizability is high and hydroxyl groups can be introduced at high concentration, and as a result, ion-conducting property can be increased.

In the fluorine-containing polymer (Ib) of the solid electrolyte of the present invention, it is preferable that the structural unit (M1b) having the structure D in its side chain is contained in an amount of not less than 5% by mole, preferably not less than 10% by mole, more preferably not less than 30% by mole, further preferably not less than 50% by mole based on the whole structural units constituting the fluorine-containing polymer. When the structural unit D is contained within the mentioned range, ion-conducting property becomes good.

With respect to a molecular weight of the non-crystalline fluorine-containing polymer (Ib) of the present invention, for example, an average degree of polymerization is from 3 to 80,000. A number average molecular weight of the polymer is selected within a range of not less than 500, preferably not less than 1,000, particularly preferably not less than 2,000, and not more than 1,000,000, preferably not more than 500,000, particularly preferably not more than 10,000, further preferably not more than 5,000.

Examples of the end structure Rf$^2$ represented by the formula (D1b) are, for instance, -D-CH$_2$OH, -D-CF(CF$_3$)CH$_2$OH, -D-CF$_2$CF$_2$CH$_2$OH, -D-CF$_2$CF$_2$CF$_2$CH$_2$OH, -D-CH$_2$CF$_2$CH$_2$OH, -D-CH$_2$OCH$_2$CH(OH)CH$_2$OH, -D-CF(CF$_3$)CH$_2$OCH$_2$CH(OH)CH$_2$OH, -D-CF$_2$CF$_2$CH$_2$OCH$_2$CH(OH)CH$_2$OH and the like, and more concretely there are, for instance,
—(OCF(CF$_3$)CF$_2$)$_n$—O—CF(CF$_3$)CH$_2$OH,
—(OCF$_3$CF(CF$_3$))$_n$—O—CF$_2$CF$_3$CH$_2$OH,
—(OCF$_3$CF$_2$)$_n$—O—CF$_2$CF$_3$CH$_2$OH
and the like, wherein n is 0 or an integer of from 1 to 3.

Among them, preferred are -D-CH$_2$OH, -D-CF(CF$_3$)CH$_2$OH and -D-CH$_2$OCH$_2$CH(OH)CH$_2$OH, and more concretely preferred are —(OCF(CF$_3$)CF$_2$)$_n$—O—CF(CF$_3$)CH$_2$OH and —(OCF$_3$CF(CF$_3$))$_n$—O—CF$_2$CF$_3$CH$_2$OH,
from the viewpoint of excellent heat resistance and oxidation resistance and good ion-conducting property.

Examples of the structural unit A in the formula (1b) are those exemplified in the structural unit A in the fluorine-containing polymer (I) of the formula (1). The structural unit A may contain or may not contain hydroxyl group or other nonionic functional group. The structural unit A containing a nonionic functional group is more preferred since ion-conducting property can be improved.

When the fluorine-containing polymer (Ib) having hydroxyl group is used, an ionic polymer or a salt thereof (IIc) is used as the electrolytic compound (II).

Examples of the ionic polymer or salt thereof (IIc) are as exemplified supra. Particularly preferred are polymers having at least one of —SO$_3^-$ or —COO$^-$ since oxidation resistance is strong and mechanical strength and stability of form can be maintained and further since acidity is particularly high and a concentration of hydrogen ion (H$^+$) can be set high.

Preferred examples thereof are concretely polyacrylic acid, polymethacrylic acid, polyphosphoric acid, sulfonated polystyrene, sulfonated polyethylene, polyvinylsulfonic acid and the like, and particularly preferred are polymers having an anionic functional group such as —SO$_3^-$ or —COO$^-$ at an end of the polymer side chain. Preferred are fluorine-containing polymers, particularly perfluoro polymers having —SO$_3^-$ or —COO$^-$, for example, a copolymer of TFE and perfluoro vinyl ether having —SO$_3^-$ group, a copolymer of TFE and perfluoro vinyl ether having —COO$^-$ group, and the like. Known as commercially available polymers are NAFFION® available from du Pont and FLEMION® available from Asahi Glass Co., Ltd.

Examples of the polymer cation are hydrogen ion, metal cation, ammonium ion, amidinium ion and guadinium ion.

With respect to the proportion of the ionic polymer or the salt thereof (IIc) to the fluorine-containing polymer (Ib) having hydroxyl group, the amount of (IIc) is from 0.01 to 100 parts by weight based on 100 parts by weight of (Ib). If the amount of (IIc) is less than 0.01 part by weight, a concentration of the ionic polymer or the salt thereof is too low and ion-conducting property cannot be obtained. Also if the amount of (IIc) exceeds 100 parts by weight, a concentration of the ionic polymer or the salt thereof is too high and polymer motion is significantly blocked and therefore ion-conducting property cannot be obtained.

The second of the present invention relates to the solid electrolyte which comprises (I) the above-mentioned non-crystalline fluorine-containing polymer having polar non-ionic functional group and the structural unit D, (II) the electrolytic compound, and (III) the solvent such as an organic solvent or water.

Also in the solid electrolyte of the second of the present invention, the non-crystalline fluorine-containing polymer (I) and the electrolytic compound (II) which are explained supra are similarly raised preferably.

Examples of the solvent (III) are aprotic organic solvents, protonic organic solvents and water, and an optimum solvent is selected depending on applications. For example, in the case of an electrolyte for Li ion battery, an aprotic organic solvent is selected, and in the case of an electrolyte for fuel cell, a protonic organic solvent or water is selected. Generally it is preferable that in the case of an electrochemical device using a metal cation, an aprotic organic solvent is used, and in the case of an electrochemical device using a hydrogen ion, a protonic organic solvent or water is used.

As an aprotic organic solvent, an optional one can be used as far as it is chemically stable. Desirable are ethers, esters and carbonates because a dielectric constant thereof is high and also from the viewpoint of dissociation and solubility of the electrolytic compound.

Examples of desirable aprotic organic solvent are propylene carbonate, ethylene carbonate, dimethyl carbonate, diethyl carbonate, methyl ethyl carbonate, butylene carbonate, γ-butyrolactone, 3-methyl-2-oxazoline, tetrahydrofuran, dioxane, dimethoxyethane, polyethylene oxide and triethyleneglycol dimethylether.

As a protonic organic solvent, an optional one can be used as far as it is chemically stable, and there are alcohol and carboxylic acid.

Examples of the protonic organic solvent are methanol, ethanol, propanol, isopropanol, butanol, hexanol, phenol, acetic acid, benzoic acid and partly fluorinated compounds thereof.

The solid electrolyte of the present invention can be prepared in the manner mentioned below.

For example, in the case of a totally solid electrolyte comprising (I) and (II), a method of kneading (I) and (II) or a method of dissolving and mixing (I) and (II) in a solvent and then distilling off the solvent is employed. Also, in the case where (I) is a crosslinked polymer being insoluble in a solvent, there are a method of mixing (I) with (II) before crosslinking of (I) and then carrying out crosslinking, a method of immersing a crosslinked film in a solution of (II) and then distilling off the solvent and the like method.

In the case of a solid electrolyte comprising (I), (II) and (III), there can be employed a method of using the component (III) as a solvent in the above-mentioned methods and leave the solvent present in a proper amount and a method of impregnating the totally solid electrolyte which comprises (I) and (II) and is obtained in the above-mentioned methods, with (III).

The solid electrolyte of the present invention is excellent in ion-conducting property, durability, safety, mechanical strength, etc. Making the use of those properties, a solid electrolyte in the form of thin film having a large area can be made easily, and is applicable to various electrochemical devices. Examples of the electrochemical device to which the solid electrolyte is applicable are fuel cell, electrolytic capacitor, solid display devices such as electroluminescence and sensors such as a current sensor and a gas sensor.

In those applications, fuel cells and electrolytic capacitors (condensers) are explained below.

Fuel cells are spotlighted as an electric generator which assures clean environment and has high generation efficiency since oxides such as sulfur and nitrogen are not generated and energy conversion efficiency is high. Fuel cells have a structure comprising a positive electrode, a negative electrode and an electrolyte, in which a gas diffusion layer and an active material are incorporated in the electrodes and the electrolyte is present between the electrodes. Fuel cells which are widely employed are ones having a polymer solid electrolyte, and a solid electrolyte impregnated with water are used suitably. Those fuel cells exhibit high ion-conducting property, but when hydrocarbon and alcohol are used as a fuel, there is a problem that carbon monoxide is generated as a by-product and poisons an electrode catalyst, thereby lowering properties of the cells. Therefore, an electrolyte prepared using an organic acid was proposed (JP8-171923A). However it is essential to operate the cell at high temperature of not less than 100° C. and therefore the cell is lack in practicability. Also when polyether oxide is used as a matrix, there is a problem that the polymer is deteriorated remarkably.

When the fluorine-containing polymer of the present invention is used as an ion conductor forming an electrolyte, a battery can be operated at room temperature, deterioration of the polymer is less and an excellent solid electrolyte for fuel cells can be obtained.

An electrolytic capacitor is produced so as to exhibit an electrostatic capacity by making an electrode having a large specific surface area by etching a bulb metal such as aluminum through a chemical and electrochemical method or by baking of powder, and then impregnating the electrode with a liquid electrolyte. As applications of the electrolytic capacitor are widened to power sources for mobile phones and portable personal computer, further downsizing and decreasing of resistance are demanded. When an ion-conducting liquid electrolyte is used, its ionic conductivity is low and therefore, there is a trial to use an electrolyte in the form of gel (JP2001-217149A), but the ion-conducting property is still insufficient.

However when the fluorine-containing polymer of the present invention is used as an ion conductor forming an electrolyte, the electrolyte can have sufficient ion-conducting property.

Also in addition to a fuel cell, a capacitor is used on an electric drive system using a fuel cell. The solid electrolyte of the present invention can also be used effectively on such a capacitor.

The present invention is then explained by means of examples and preparation examples, but is not limited to them.

In the following Examples, physical properties are evaluated using the following equipment and measuring conditions.

(1) NMR: AC-300 available from BRUKER CO., LTD. Measuring conditions of $^1$H-NMR: 300 MHz (tetramethylsilane=0 ppm) Measuring conditions of $^{19}$F-NMR: 282 MHz (trichlorofluoromethane=0 ppm)

(2) IR analysis: Measuring is carried out at room temperature with a Fourier-transform infrared spectrophotometer 1760X available from Perkin Elmer Co., Ltd.

(3) GPC: A number average molecular weight is calculated from the data measured by gel permeation chromatography (GPC) by using GPC HLC-8020 available from Toso Kabushiki Kaisha and columns available from Shodex (one GPC KF-801, one GPC KF-802 and two GPC KF-806M were connected in series) and flowing tetrahydrofuran (THF) as a solvent at a flowing rate of 1 ml/min.

(4) Measurement of impedance: A proton conductivity is calculated by putting an electrolyte between platinum electrodes, measuring an impedance in a frequency range of from 0.1 to 10 kHz at room temperature with SOLARTRON 1280 (available from Toyo Technica) and drawing a Cole-Cole's plot. Ionic conductivity is measured by using nickel blocking electrodes.

(5) Tensile strength test:

A tensile strength is measured according to JISK7113 by using a kinetic visco-elasticity meter (RSA-II available from Reometrics Inc.). Tension is applied at a rate of 50 mm/min.

EXAMPLE 1

Synthesis of Polymer Having Fluorine-Containing Ether Structure in its Side Chain Into a 100 ml four-necked glass flask equipped with a stirrer and a thermometer were poured 20.8 g of perfluoro-(1,1,9,9-tetrahydro-2,5-bistrifluoromethyl-3,6-dioxanonenol), 6.6 g of perfluorohexane solution of 8.0% by weight of:

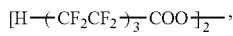

20 ml of HCFC141b and 20 ml of chloroform, followed by sufficiently replacing the inside of the flask with nitrogen and stirring at 20° C. for 24 hours in nitrogen gas stream. As a result, a highly viscous liquid was obtained.

The obtained viscous solution was dissolved in diethyl ether and then poured into perfluorohexane, followed by separation and vacuum drying to obtain 19.2 g of colorless transparent polymer.

According to $^{19}$F-NMR, $^{1}$H-NMR and IR analyses, this polymer was recognized to be a fluorine-containing polymer consisting of the above-mentioned structural unit of fluorine-containing ether and having hydroxyl group at an end of its side chain. A number average molecular weight of the polymer measured by GPC analysis using tetrahydrofuran (THF) as a solvent was 1,900, and a weight average molecular weight thereof was 2,500.

PREPARATION EXAMPLE 1

Synthesis of perfluoro-(9,9-dihydro-2,5-bistrifluoromethyl-3,6-dioxanonenoic acid Into a 500 ml four-necked flask equipped with a thermometer and a dropping funnel were poured 150 ml of deionized DMF, 19.3 g of dimethylamine and 42 g of triethylamine under nitrogen gas atmosphere. Thereto was added dropwise slowly 176 g of perfluoro-(9,9-dihydro-2,5-bistrifluoromethyl-3,6-dioxanonenoic acid chloride):

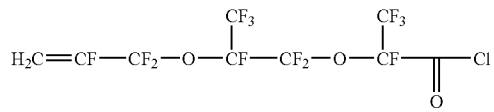

in an ice bath with stirring. After completion of the addition, the flask temperature was gradually increased to room temperature, and stirring was carried out at room temperature for one hour, followed by separation of the reaction solution with an acid and water to take out an oil layer. After drying of the oil layer with magnesium sulfate, distillation under reduced pressure followed to obtain 157 g of perfluoro-(9,9-dihydro-2,5-bistrifluoromethyl-3,6-dioxanonenoic acid)-dimethylamide:

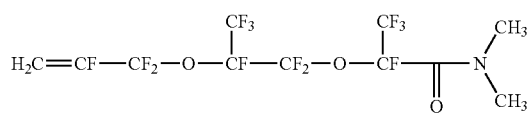

According to $^{19}$F-NMR, $^{1}$H-NMR, and IR analyses, the obtained product was recognized to be the above-mentioned compound.

EXAMPLE 2

Synthesis of Polymer Having Fluorine-Containing Ether Structure in its Side Chain Into a 100 ml four-necked glass flask equipped with a stirrer and a thermometer were poured 18.2 g of perfluoro-(9,9-dihydro-2,5-bistrifluoromethyl-3,6-dioxanonenoic acid)-dimethylamide, 6.6 g of perfluorohexane solution of 8.0% by weight of:

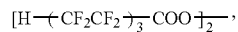

20 ml of HCFC141b and 20 ml of chloroform, followed by sufficiently replacing the inside of the flask with nitrogen and stirring at 20° C. for 24 hours in nitrogen gas stream. As a result, a highly viscous liquid was obtained.

The obtained viscous solution was dissolved in diethyl ether and then poured into perfluorohexane, followed by separation and vacuum drying to obtain 15.1 g of colorless transparent polymer.

According to $^{19}$F-NMR, $^{1}$H-NMR and IR analyses, this polymer was recognized to be a fluorine-containing polymer consisting of the above-mentioned structural unit of fluorine-containing ether and having dimethylamide group at an end of its side chain. A number average molecular weight of the polymer measured by GPC analysis using tetrahydrofuran (THF) as a solvent was 2,300, and a weight average molecular weight thereof was 2,800.

PREPARATION EXAMPLE 2

Synthesis of perfluoro-(1,1,9,9-tetrahydro-2,5-bistrifluoromethyl-3,6-dioxanonenoyl)-methyl-carbonate Into a 500 ml four-necked flask equipped with a thermometer and a dropping funnel were poured 150 ml of deionized THF and 42 g of triethylamine under nitrogen gas atmosphere. Thereto was added dropwise 163 g of perfluoro-(1,1,9,9-tetrahydro-2,5-bistrifluoromethyl-3,6-dioxanonenol):

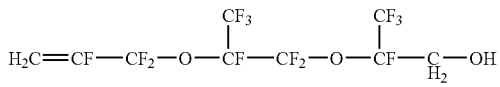

in an ice bath with stirring. Then 37.6 g of methylchloroformate:

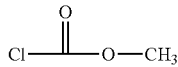

was added thereto dropwise. After completion of the addition, the flask temperature was gradually increased to room temperature, and stirring was carried out at room temperature for one hour, followed by separation of the reaction solution with an acid and water to take out an oil layer. After drying of the oil layer with magnesium sulfate, distillation under reduced pressure followed to obtain 144 g of perfluoro-(1,1,9,9-tetrahydro-2,5-bistrifluoromethyl-3,6-dioxanonenoyl)-methylcarbonate:

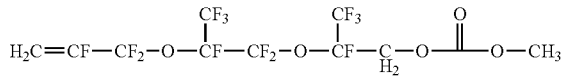

According to $^{19}$F-NMR, $^1$H-NMR and IR analyses, the obtained product was recognized to be the above-mentioned compound.

EXAMPLE 3

Into a 100 ml four-necked glass flask equipped with a stirrer and a thermometer were poured 20.0 g of perfluoro-(1,1,9,9-tetrahydro-2,5-bistrifluoromethyl-3,6-dioxanonenoyl)-methyl-carbonate, 6.6 g of perfluorohexane solution of 8.0% by weight of:

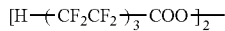

and 20 ml of HCFC141b, followed by sufficiently replacing the inside of the flask with nitrogen and stirring at 20° C. for 24 hours in nitrogen gas stream. As a result, a white solid was obtained.

The obtained product was dissolved in diethyl ether and then poured into perfluorohexane, followed by separation and vacuum drying to obtain 16.7 g of colorless transparent polymer.

According to $^{19}$F-NMR, $^1$H-NMR and IR analyses, this polymer was recognized to be a fluorine-containing polymer consisting of the above-mentioned structural unit of fluorine-containing allyl ether and having carbonate group at an end of its side chain. A number average molecular weight of the polymer measured by GPC analysis using tetrahydrofuran (THF) as a solvent was 39,000, and a weight average molecular weight thereof was 55,000.

PREPARATION EXAMPLE 3

Synthesis of perfluoro-(2-vinyloxy-ethane sulfonic acid)-dimethylamide

Into a 500 ml four-necked flask equipped with a thermometer and a dropping funnel were poured 150 ml of deionized DMF, 19.3 g of dimethlamine and 42 g of triethylamine under nitrogen gas atmosphere. Thereto was added dropwise slowly 118 g of perfluoro-(2-vinyloxy-ethane sulfonyl chloride):

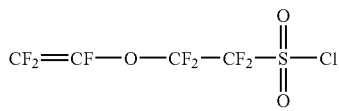

in an ice bath with stirring. After completion of the addition, the flask temperature was gradually increased to room temperature, and stirring was carried out at room temperature for one hour, followed by separation of the reaction solution with an acid and water to take out an oil layer. After drying of the oil layer with magnesium sulfate, distillation under reduced pressure followed to obtain 97 g of perfluoro-(2-vinyloxy-ethane sulfonic acid)-dimethylamide:

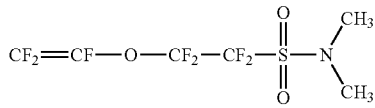

According to $^{19}$F-NMR, $^1$H-NMR and IR analyses, the obtained product was recognized to be the above-mentioned compound.

EXAMPLE 4

Synthesis of Polymer Having Fluorine-Containing Ether Structure in its Side Chain Into a 100 ml autoclave were poured 7.6 g of perfluoro-(2-vinyloxy-ethane sulfonic acid)-dimethylamide, 30 ml of HCFC141b and 16.7 g of perfluorohexane solution of 8.0% by weight of:

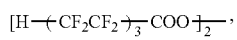

followed by evacuation and replacing of the inside of the autoclave with nitrogen five times. Then thereto was introduced 5 g of tetrafluoroethylene. The mixture was subjected to shaking at 20° C. for 24 hours with a shaking machine and the obtained solution was concentrated and re-precipitated with hexane to obtain a colorless viscous solution. According to $^{19}$F-NMR and $^1$H-NMR analyses, this polymer was recognized to be a fluorine-containing polymer comprising tetrafluoroethylene and dimethylamide in a percent by mole ratio of 62/38. A number average molecular weight of the polymer measured by GPC analysis using tetrahydrofuran (THF) as a solvent was 5,300, and a weight average molecular weight thereof was 6,800.

PREPARATION EXAMPLE 4

Synthesis of perfluoro-(2-(1-methyl-2-vinyloxy-ethoxy)ethane sulfonic acid)-dimethylamide Into a 500 ml four-necked flask equipped with a thermometer and a dropping funnel were poured 150 ml of deionized DMF, 19.3 g of dimethlamine and 42 g of triethylamine under nitrogen gas atmosphere. Thereto was added dropwise slowly 184 g of perfluoro-(2-(1-methyl-2-vinyloxy-ethoxy)ethane sulfonyl chloride):

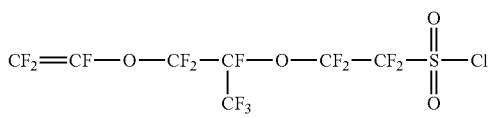

in an ice bath with stirring. After completion of the addition, the flask temperature was gradually increased to room temperature, and stirring was carried out at room temperature for one hour, followed by separation of the reaction solution with an acid and water to take out an oil layer. After drying of the oil layer with magnesium sulfate, distillation under reduced pressure followed to obtain 134 g of perfluoro-(2-(1-methyl-2-vinyloxy-ethoxy)ethane sulfonic acid)-dimethylamide:

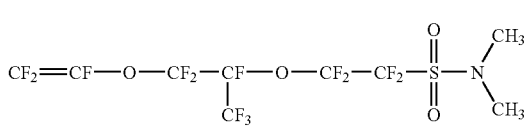

According to $^{19}$F-NMR, $^1$H-NMR and IR analyses, the obtained product was recognized to be the above-mentioned compound.

EXAMPLE 5

Synthesis of Polymer Having Fluorine-Containing Ether Structure in its Side Chain Into a 100 ml autoclave were poured 11.8 g of perfluoro-(2-(1-methyl-2-vinyloxy-ethoxy)ethane sulfonic acid)-dimethylamide, 25 ml of HCFC141b and 16.7 g of perfluorohexane solution of 8.0% by weight of:

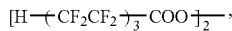

followed by evacuation and replacing of the inside of the autoclave with nitrogen five times. Then thereto was introduced 5 g of tetrafluoroethylene. The mixture was subjected to shaking at 20° C. for 24 hours with a shaking machine and the obtained solution was concentrated and re-precipitated with hexane to obtain a colorless viscous solution. According to $^{19}$F-NMR and $^1$H-NMR analyses, this polymer was recognized to be a fluorine-containing polymer comprising tetrafluoroethylene and dimethylamide in a percent by mole ratio of 58/42. A number average molecular weight of the polymer measured by GPC analysis using tetrahydrofuran (THF) as a solvent was 4,300, and a weight average molecular weight thereof was 6,200.

EXAMPLE 6

Synthesis of Polymer Having Fluorine-Containing Ether Structure in its Side Chain Into a 100 ml autoclave were poured 11.8 g of perfluoro-(2-(1-methyl-2-vinyloxy-ethoxy)ethane sulfonic acid)-dimethylamide, 25 ml of HCFC141b and 16.7 g of perfluorohexane solution of 8.0% by weight of:

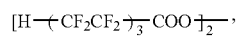

followed by evacuation and replacing of the inside of the autoclave with nitrogen five times. Then thereto was introduced 3.1 g of vinylidene fluoride. The mixture was subjected to shaking at 20° C. for 24 hours with a shaking machine and the obtained solution was concentrated and re-precipitated with hexane to obtain a colorless viscous solution. According to $^{19}$F-NMR and $^1$H-NMR analyses, this polymer was recognized to be a fluorine-containing polymer comprising vinylidene fluoride and dimethylamide in a percent by mole ratio of 52/48. A number average molecular weight of the polymer measured by GPC analysis using tetrahydrofuran (THF) as a solvent was 7,300, and a weight average molecular weight thereof was 9,200.

PREPARATION EXAMPLE 5

Synthesis of perfluoro-(1,1,9,9-tetrahydro-2,5-bistrifluoromethyl-3,6-dioxanonenoic amide)

Into a 500 ml four-necked flask equipped with a thermometer and a dropping funnel was poured 100 ml of 7N ammonia-ethanol solution under nitrogen gas atmosphere. Thereto was added dropwise 160 g of perfluoro-(1,1,9,9-tetrahydro-2,5-bistrifluoromethyl-3,6-dioxanonenoic acid)methyl ester:

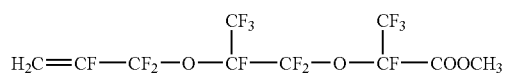

in an ice bath with stirring. After completion of the addition, the flask temperature was gradually increased to room temperature, and stirring was carried out at room temperature for three hours, followed by separation of the reaction solution with an acid and water to take out an oil layer. After drying of the oil layer with magnesium sulfate, distillation under reduced pressure was carried out and a solid component was taken out to obtain 159 g of perfluoro-(1,1,9,9-tetrahydro-2, 5-bistrifluoromethyl-3,6-dioxanonenoic amide):

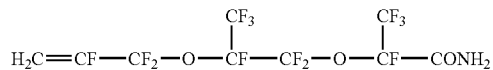

According to $^{19}$F-NMR, $^1$H-NMR and IR analyses, the obtained product was recognized to be the above-mentioned compound.

EXAMPLE 7

Synthesis of Polymer Having Fluorine-Containing Ether Structure in its Side Chain Into a 100 ml four-necked glass flask equipped with a stirrer and thermometer were poured 20 g of perfluoro-(1,1, 9,9-tetrahydro-2,5-bistrifluoromethyl-3,6-dioxanonenoic amide) synthesized in Preparation Example 5, 6.6 g of perfluorohexane solution of 8.0% by weight of:

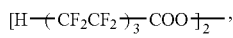

20 ml of HCFC141b and 20 ml of tetrahydrofuran (THF). After sufficiently replacing the inside of the flask with nitrogen, the mixture was subjected to stirring at 20° C. for 24 hours in nitrogen gas stream and a highly viscous liquid was obtained.

The obtained viscous liquid was dissolved in diethyl ether and then poured into a solution of hexane/HCFC141b (a 350 ml/75 ml solution mixture), followed by separation and vacuum drying to obtain 16.5 g of colorless transparent polymer.

According to $^{19}$F-NMR, $^1$H-NMR and IR analyses, this polymer was recognized to be a fluorine-containing polymer consisting of the above-mentioned structural unit of fluorine-containing ether and having amide group at an end of its side chain. A number average molecular weight of the polymer measured by GPC analysis using tetrahydrofuran (THF) as a solvent was 2,100, and a weight average molecular weight thereof was 2,700.

PREPARATION EXAMPLE 6

Synthesis of perfluoro-(1,1,9,9-tetrahydro-2,5-bistrifluoromethyl-3,6-dioxanonenamine)

Into a 500 ml four-necked flask equipped with a thermometer and a dropping funnel was poured 8.96 g of LiAlH$_4$ and 100 ml of deionized THF under nitrogen gas atmosphere. Thereto was added dropwise 100 g of perfluoro-(1,1,9,9-tetrahydro-2,5-bistrifluoromethyl-3,6-dioxanonenoic amide):

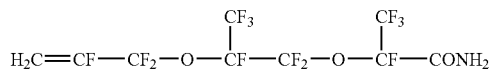

with stirring. After completion of the addition, the reaction temperature was gradually increased to 60° C., and stirring was carried out at 60° C. for five hours, followed by separation of the reaction solution with an acid and water to take out an oil layer. After drying of the oil layer with magnesium sulfate, distillation under reduced pressure was carried out and a solid component was taken out to obtain 83 g of perfluoro-(1,1,9,9-tetrahydro-2,5-bistrifluoromethyl-3,6-dioxanonenamine):

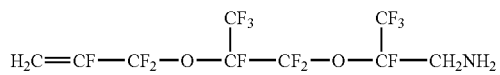

According to $^{19}$F-NMR, $^1$H-NMR and IR analyses, the obtained product was recognized to be the above-mentioned compound.

EXAMPLE 8

Synthesis of Polymer Having Fluorine-Containing Ether Structure in its Side Chain Into a 100 ml four-necked glass flask equipped with a stirrer and thermometer were poured 20 g of perfluoro-(1,1,9,9-tetrahydro-2,5-bistrifluoromethyl-3,6-dioxanonenamine) synthesized in Preparation Example 6, 6.6 g of perfluorohexane solution of 8.0% by weight of:

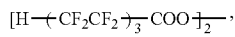

20 ml of HCFC141b and 20 ml of tetrahydrofuran (THF). After sufficiently replacing the inside of the flask with nitrogen, the mixture was subjected to stirring at 20° C. for 24 hours in nitrogen gas stream and a highly viscous liquid was obtained.

The obtained viscous liquid was dissolved in diethyl ether and then poured into a solution of hexane/HCFC141b (a 350 ml/75 ml solution mixture), followed by separation and vacuum drying to obtain 15.3 g of colorless transparent polymer.

According to $^{19}$F-NMR, $^1$H-NMR and IR analyses, this polymer was recognized to be a fluorine-containing polymer consisting of the above-mentioned structural unit of fluorine-containing ether and having amine group at an end of its side chain. A number average molecular weight of the polymer measured by GPC analysis using tetrahydrofuran (THF) as a solvent was 2,200, and a weight average molecular weight thereof was 2,600.

EXAMPLE 9

Synthesis of Polymer Having Fluorine-Containing Ether Structure in its Side Chain In a 100 ml four-necked glass flask equipped with a stirrer and thermometer, 5 g of α-fluoroacrylate: $CH_2$=$CFCOOCH_2CF_2CF_2OCF_2CF_2CF_2OCF_2CF_2CF_3$ having a fluorine-containing ether in its side chain and 0.6 g of acrylamide were dissolved in 20 ml of MIBK solution. Thereto was added 0.07 g of AIBN, and the inside of the flask was sufficiently replaced with nitrogen, followed by stirring the mixture at 70° C. for 8 hours in nitrogen gas stream. The obtained solution was subjected to re-precipitation using hexane as a poor solvent for separation of viscous solution and then vacuum drying to obtain 3.5 g of colorless transparent viscous liquid.

According to $^{19}$F-NMR, $^1$H-NMR and IR analyses, this polymer was recognized to be a polymer comprising α-fluoroacrylate having a fluorine-containing ether in its side chain and acrylamide in a percent by mole ratio of 59/41. A number average molecular weight of the polymer measured by GPC analysis using tetrahydrofuran (THF) as a solvent was 9,300, and a weight average molecular weight thereof was 12,000.

EXAMPLE 10

Production of Solid Electrolyte

To 90 parts by weight of acetone solution containing lithium perchlorate in a concentration of 1 mole/liter was added 30 parts by weight of fluorine-containing polymer obtained in Example 3, followed by evaporation of acetone to obtain a rubber-like fluorine-containing polymer solid electrolyte.

Then the both sides of a sample was clipped with nickel blocking electrodes and ionic conductivity was measured at 25° C. by an alternating current complex impedance method. As a result, ionic conductivity was $2 \times 10^{-5}$ S/cm.

COMPARATIVE EXAMPLE 1

Production of Solid Electrolyte

A polymer solid electrolyte was produced in the same manner as in Example 10 using PEO having a weight average molecular weight of 20,000 and ionic conductivity was measured. As a result, ionic conductivity was $8 \times 10^{-8}$ S/cm.

EXAMPLE 11

Production of Solid Electrolyte

To 30 parts by weight of propylene carbonate solution containing lithium perchlorate in a concentration of 1 mole/liter was added 30 parts by weight of fluorine-containing polymer obtained in Example 3 to obtain a fluorine-containing polymer solid electrolyte.

Then the both sides of a sample was clipped with nickel blocking electrodes and ionic conductivity was measured at 25° C. by an alternating current complex impedance method. As a result, ionic conductivity was $2 \times 10^{-3}$ S/cm.

EXAMPLE 12

Production of Solid Electrolyte

In 30 parts by weight of propylene carbonate solution containing lithium perchlorate in a concentration of 1 mole/liter was sufficiently dissolved 7 parts by weight of polyvinylidene fluoride having a weight average molecular weight of about 300,000 at a temperature of about 100° C. A temperature of the obtained solution was decreased to 50° C., and to the solution was added 30 parts by weight of fluorine-containing polymer obtained in Example 3 to obtain a fluorine-containing polymer solid electrolyte.

Then the both sides of a sample was clipped with nickel blocking electrodes and ionic conductivity was measured at 25° C. by an alternating current complex impedance method. As a result, ionic conductivity was $8 \times 10^{-3}$ S/cm.

This sample was cut to a specific size and stretched at a low rate of 5 cm/min with a tensile strength tester. A load at which the sample was cut was measured. As a result, the load was 8 kgf/cm$^2$.

EXAMPLE 13

Production of Solid Electrolyte

In 16 g of propylene carbonate was dissolved 3.5 g of tetraethylammoniumtetrafluoroborate (Et$_4$NBF$_4$). Then 2 g of film of the polymer obtained in Example 2 was immersed in this solution and allowed to stand at 80° C. for one hour. After that, the film was taken out and subjected to vacuum drying at 100° C. for two hours to obtain a polymer solid electrolyte film.

Then the both sides of a sample film was clipped with nickel blocking electrodes and ionic conductivity was measured at 25° C. by an alternating current complex impedance method. Ionic conductivity was $7 \times 10^{-3}$ S/cm.

EXAMPLE 14

Production of Solid Electrolyte

In 16 g of acetone was dissolved 3.5 g of tetraethylammoniumtetrafluoroborate (Et$_4$NBF$_4$). Then 2 g of film of the polymer obtained in Example 3 was immersed in this solution and allowed to stand at 30° C. for one hour. After that, the film was taken out and acetone was evaporated to obtain a polymer solid electrolyte film. Then the both sides of this sample film was clipped with nickel blocking electrodes and ionic conductivity was measured at 25° C. by an alternating current complex impedance method. Ionic conductivity was $2 \times 10^{-4}$ S/cm.

EXAMPLE 15

Production of Polymer Electrolyte

A 5 g of film of fluorine-containing polyether obtained in Example 1 was immersed in 1 g of pentafluoroethanecarboxylic acid at 25° C. for one hour. After drying at 100° C. for one hour, the solid film was taken out to obtain a polymer electrolyte film. This film was clipped with platinum electrodes, and proton conductivity of this film measured by an alternating current complex impedance method was $2 \times 10^{-2}$ S/cm at 25° C.

EXAMPLE 16

Production of Polymer Electrolyte

A 5 g of film of fluorine-containing polyether obtained in Example 1 was immersed in 20 g of acetone containing 1 g of heptafluoropropylsulfonic acid. Acetone was evaporated, and a polymer electrolyte was obtained. This film was clipped with platinum electrodes, and proton conductivity measured by an alternating current complex impedance method was $3 \times 10^{-1}$ S/cm at 25° C.

EXAMPLE 17

Production of Polymer Electrolyte

A 5 g of film of fluorine-containing polyether obtained in Example 1 was immersed in 20 g of acetone containing 1 g of polyphosphoric acid. Acetone was evaporated, and a polymer electrolyte was obtained. This film was clipped with platinum electrodes, and proton conductivity measured by an alternating current complex impedance method was $3 \times 10^{-2}$ S/cm at 25° C.

EXAMPLE 18

Production of Polymer Electrolyte

A 5 g of film of fluorine-containing polymer obtained in Example 4 was immersed in 20 g of acetone containing 1 g of polyphosphoric acid. Acetone was evaporated, and a polymer electrolyte was obtained. This electrolyte was clipped with platinum electrodes, and proton conductivity measured by an alternating current complex impedance method was $2 \times 10^{-2}$ S/cm at 25° C.

EXAMPLE 19

Production of Polymer Electrolyte

A 5 g of film of fluorine-containing polymer obtained in Example 5 was immersed in 20 g of acetone containing 1 g of polyphosphoric acid. Acetone was evaporated, and a polymer electrolyte was obtained. This film was clipped with platinum electrodes, and proton conductivity measured by an alternating current complex impedance method was $5\times10^{-2}$ S/cm at 25° C.

EXAMPLE 20

Production of Polymer Electrolyte

A 5 g of film of fluorine-containing polymer obtained in Example 6 was immersed in 20 g of acetone containing 1 g of polyphosphoric acid. Acetone was evaporated, and a polymer electrolyte was obtained. This film was clipped with platinum electrodes, and proton conductivity measured by an alternating current complex impedance method was $2\times10^{-2}$ S/cm at 25° C.

EXAMPLE 21

Synthesis of Polymer Having Fluorine-Containing Ether Structure in its Side Chain Into a 100 ml four-necked glass flask equipped with a stirrer and a thermometer were poured 20.8 g of perfluoro-(1,1,9,9-tetrahydro-2,5-bistrifluoromethyl-3,6-dioxanonenol), 22 g of perfluorohexane solution of 8.0% by weight of:

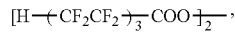

20 ml of HCFC141b and 0.73 g of THF, followed by sufficiently replacing the inside of the flask with nitrogen and stirring at 20° C. for 24 hours in nitrogen gas stream. As a result, a colorless transparent viscous liquid was obtained.

The obtained viscous solution was poured into chloroform for separation and vacuum drying to obtain 18.1 g of colorless transparent polymer.

According to $^{19}$F-NMR, $^{1}$H-NMR and IR analyses, this polymer was recognized to be a fluorine-containing polymer consisting of the above-mentioned structural unit of fluorine-containing ether and having hydroxyl group at an end of its side chain. A number average molecular weight of the polymer measured by GPC analysis using tetrahydrofuran (THF) as a solvent was 2,000, and a weight average molecular weight thereof was 2,700.

EXAMPLE 22

Production of Polymer Electrolyte

In 10 g of polymer obtained in Example 21 was immersed 10 g of fluorine-containing polymer solid electrolyte (trade name NAFFION 117 available from Asahi Glass Co., Ltd.) having sulfonic acid group at an end of its side chain at 120° C. After the 5-minute immersing, the obtained composite film was taken out.

This composite film was clipped with platinum electrodes, and proton conductivity measured by an alternating current complex impedance method was $9\times10^{-3}$ S/cm at 120° C.

The present invention can provide a solid electrolyte which has an excellent ion-conducting property, is high in oxidation resistance, is stable electrochemically and also thermally and can have sufficient strength. The solid electrolyte is applicable to various electrochemical devices, by making use of those characteristics. Also the fluorine-containing polymer solid electrolyte of the present invention assures easy fabrication, can have a large area and is safe, and therefore is applicable to large size batteries and capacitors.

What is claimed is:

1. A fluorine-containing polymer solid electrolyte which has an ionic conductivity of from $10^{-10}$ to $10^{1}$ S/cm measured at 25° C. by alternating current complex impedance method and comprises:

(Ib) a non-crystalline fluorine-containing polymer having hydroxyl which has a number average molecular weight of from 500 to 1,000,000, has recurring units having, in its side chain, a structural unit D derived from a fluorine-containing ether and represented by the formula (D):

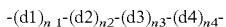

wherein
(d1) is —(OCF$_2$CF$_2$CF$_2$)—,
(d2) is —(OCFX$^1$CF$_2$)— or —(OCF$_2$CFX$^1$)—,
(d3) is —(OCFX$^2$)—,
(d4) is —(OCH$_2$CF$_2$CF$_2$)— or —(OCF$_2$CF$_2$CH$_2$)—;
n1, n2, n3 and n4 are the same or different and each is 0 or an integer of 1 or more, n1+n2+n3+n4 is an integer of from 1 to 4; X$^1$ and X$^2$ are the same or different and each is F or CF$_3$; in the side chain, two or more structural units (D) are not bonded continuously to each other, and is represented by the formula (1b):

-(M1b)-(A)-    (1b)

wherein the structural unit M1b is a structural unit derived from a fluorine-containing ethylenic monomer (m1b) having hydroxyl and represented by the formula (M1b-2):

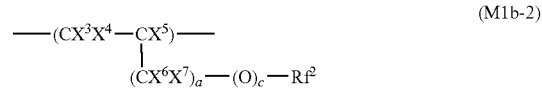

wherein X$^3$ and X$^4$ are the same or different and each is H or F; X$^5$ is H, F, CH$_3$ or CF$_3$; X$^6$ and X$^7$ are the same or different and each is H, F or CF$_3$; Rf$^2$ is a fluorine-containing monovalent organic group having hydroxyl which has 2 to 100 carbon atoms and 1 to 4 structures of the formula (D1b):

wherein R$^1$ is a di-, tri- or tetra-valent organic group; n5 is 0 or 1; n6 is an integer of from 1 to 3; D is as defined in the formula (D), and two or more structural units (D) are not bonded continuously to each other; a is 0 or an integer of from 1 to 3; c is 0 or 1;

the structural unit A is a structural unit derived from a monomer (a) copolymerizable with the monomer (m1b), and the structural units M1b and A are contained in amounts of from 1 to 100% by mole and from 0 to 99% by mole, respectively, and (IIc) at least one selected from ionic polymers and salts thereof.

2. The fluorine-containing polymer solid electrolyte of claim 1, wherein in the fluorine-containing polymer (Ib) having hydroxyl, the structural unit M1b is a structural unit derived from a fluorine-containing ethylenic monomer having hydroxyl and represented by the formula (M1b-2a):

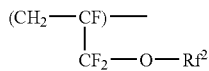

wherein $Rf^2$ is the same as $Rf^2$ in the formula (M1b-2).

3. The fluorine-containing polymer solid electrolyte of claim 1, wherein the fluorine-containing polymer (Ib) having hydroxyl contains the structural unit M1b in an amount of not less than 50% by mole.

4. The fluorine-containing polymer solid electrolyte of claim 1, wherein a number average molecular weight of the fluorine-containing polymer (Ib) having hydroxyl is from 500 to 10,000.

5. The fluorine-containing polymer solid electrolyte of claim 1, wherein the ionic polymers or salts thereof (IIc) are fluorine-containing polymers having at least one of $-SO_3^-$ and $-COO^-$.

6. An electrochemical device produced using the fluorine-containing polymer solid electrolyte of claim 1.

7. A battery produced using the fluorine-containing polymer solid electrolyte of claim 1.

8. A capacitor produced using the fluorine-containing polymer solid electrolyte of claim 1.

9. A solid display device produced using the fluorine-containing polymer solid electrolyte of claim 1.

10. A sensor produced using the fluorine-containing polymer solid electrolyte of claim 1.

* * * * *